US012656968B2

(12) United States Patent
Lee et al.

(10) Patent No.: US 12,656,968 B2
(45) Date of Patent: Jun. 16, 2026

(54) PROCESSING-IN-MEMORY (PIM) HIGH BANDWIDTH MEMORY (HBM) DEVICES INCLUDING PIM DYNAMIC RANDOM ACCESS MEMORY (DRAM) DIES

(71) Applicant: SAMSUNG ELECTRONICS CO., LTD., Suwon-si (KR)

(72) Inventors: Jeonil Lee, Suwon-si (KR); Jinwoo Han, Suwon-si (KR); Seryeun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/650,412

(22) Filed: Apr. 30, 2024

(65) Prior Publication Data

US 2025/0053322 A1      Feb. 13, 2025

(30) Foreign Application Priority Data

Aug. 8, 2023    (KR) ........................ 10-2023-0103696

(51) Int. Cl.
G06F 3/06          (2006.01)

(52) U.S. Cl.
CPC .......... G06F 3/0638 (2013.01); G06F 3/0604 (2013.01); G06F 3/0673 (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS

| | | | |
|---|---|---|---|
| 10,437,482 B2 * | 10/2019 | Chang | G06F 12/02 |
| 10,936,891 B2 | 3/2021 | Kim et al. | |
| 11,194,579 B2 | 12/2021 | Shin et al. | |
| 11,467,965 B2 | 10/2022 | Song | |

(Continued)

OTHER PUBLICATIONS

M. Han, J. Hyun, S. Park and W. Baek, "Hotness- and Lifetime-Aware Data Placement and Migration for High-Performance Deep Learning on Heterogeneous Memory Systems," in IEEE Transactions on Computers, vol. 69, No. 3, pp. 377-391, Mar. 1, 2020, doi: 10.1109/TC.2019.2949408. (Year: 2020).*

(Continued)

*Primary Examiner* — Daniel C. Chappell
(74) *Attorney, Agent, or Firm* — Sughrue Mion, PLLC

(57)          ABSTRACT

There is provided a memory device including a processing-in-memory (PIM) dynamic random access memory (DRAM) die(s) and PIM-high bandwidth memory (HBM) devices. The memory device includes a core peripheral circuit structure including a bank core circuit including a row decoder and a sense amplifier of each of a plurality of banks, and a cell array structure disposed on the core peripheral circuit structure. The bank core circuit includes a plurality of sub core circuits correspondingly connected to the plurality of sub cell blocks, respectively. Each of the plurality of sub core circuits includes a sense amplifier segmented to be connected to a corresponding sub cell block, and a processing element connected to the segmented sense amplifier and configured to perform a logical operation on an operand that is data loaded into the segmented sense amplifier.

20 Claims, 27 Drawing Sheets

(58) Field of Classification Search

CPC ... G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 11,474,950 B2 | 10/2022 | O | |
| 11,514,996 B2 | 11/2022 | Sity et al. | |
| 11,600,340 B2 | 3/2023 | Seo et al. | |
| 2019/0050325 A1* | 2/2019 | Malladi | G06F 12/023 |
| 2020/0074202 A1* | 3/2020 | Kim | G06N 3/08 |
| 2020/0183837 A1* | 6/2020 | Gu | G06F 15/8046 |
| 2022/0398032 A1 | 12/2022 | Jeong et al. | |
| 2023/0067220 A1 | 3/2023 | Simsek-Ege et al. | |

OTHER PUBLICATIONS

B. J. Kim, T. Jeong, S. Yun and E.-Y. Chung, "DH-PIM: Maximizing Computing Unit Utilization in Digital PIM by Dual Half Mode Extension," in IEEE Transactions on Computer-Aided Design of Integrated Circuits and Systems, vol. 45, No. 1, pp. 83-93, Jan. 2026, doi: 10.1109/TCAD.2025.3571857. (Year: 2026).*

K.-I. Moon, H.-Y. Son and K. Lee, "Advanced Packaging Technologies in Memory Applications for Future Generative AI Era," 2023 International Electron Devices Meeting (IEDM), San Francisco, CA, USA, 2023, pp. 1-4, doi: 10.1109/IEDM45741.2023.10413890. (Year: 2023).*

* cited by examiner

PROCESSING-IN-MEMORY (PIM) HIGH BANDWIDTH MEMORY (HBM) DEVICES INCLUDING PIM DYNAMIC RANDOM ACCESS MEMORY (DRAM) DIES

CROSS-REFERENCE TO RELATED APPLICATION

This application is based on and claims priority under 35 U.S.C. § 119 to Korean Patent Application No. 10-2023-0103696, filed on Aug. 8, 2023, in the Korean Intellectual Property Office, the disclosure of which is incorporated by reference herein in its entirety.

BACKGROUND

1. Field

The disclosure relates to a semiconductor device, and more particularly, to processing-in-memory (PIM) high bandwidth memory (HBM) devices including PIM dynamic random access memory (DRAM) dies which enable improved processing performance and low power consumption.

2. Description of Related Art

Applications, such as high-performance and/or graphics algorithms, are data and computationally intensive. Machine learning applications, such as neural networks, may include a large number of operations including a large number of calculations and large memory requirements. Machine learning applications require a computing system with large computational and memory capabilities to more accurately train or learn different data sets. A PIM-type memory device is being developed so as to perform some computational operations of a computing system via internal processing. A computational operation load on a computing system may be reduced via a PIM processing operation of a memory device.

HBM is a high-performance random access memory (RAM) interface for three-dimensional (3D) stacked DRAM. HBM may be used for memory-centric, computationally heavy neural networks or other artificial intelligence (AI). HBM provides a wide range of input/output by using a multi-channel interface method and may be useful for the processing efficiency of hosts using HBM. Accordingly, the performance of computing systems may depend on PIM-HBM processing efficiency and access time.

SUMMARY

The disclosure provides processing-in-memory (PIM) high bandwidth memory (HBM) devices including PIM dynamic random access memory (DRAM) dies which enable improved processing performance and low power consumption.

According to an aspect of the disclosure, a memory device includes: a plurality of banks, wherein each bank of the plurality of banks comprises: a plurality of sub cell blocks, wherein each of the plurality of sub cell blocks comprises a plurality of memory cells; a plurality of word lines; a plurality of bit lines; and a bank core circuit comprising: a row decoder connected to the plurality of memory cells via the plurality of word lines extending in a first horizontal direction, wherein the row decoder comprises a plurality of sub word line driver segments; a sense amplifier connected to the plurality of memory cells via the plurality of bit lines extending in a second horizontal direction crossing the first horizontal direction, wherein the sense amplifier comprises a plurality of sense amplifier segments; and a plurality of sub core circuits comprising a first processing element, a sub word line driver segment of the plurality of sub word line driver segments, and a sense amplifier segment of the plurality of sense amplifier segments, wherein the first processing element and the sense amplifier segment of each sub core circuit of the plurality of sub core circuits are connected, wherein the plurality of sub core circuits of a given bank of the plurality of banks are correspondingly connected to the plurality of sub cell blocks of the given bank of the plurality of banks, wherein for each bank of the plurality of banks, the plurality of sub cell blocks form a cell array structure, and the bank core circuit forms a core peripheral circuit structure, wherein for each respective bank of the plurality of banks, the cell array structure of the respective bank is disposed on the core peripheral circuit structure of the respective bank and overlaps the core peripheral circuit structure of the respective bank in a vertical direction, and wherein each sub core circuit of the plurality of sub core circuits of each respective bank of the plurality of banks is configured to perform a logical operation on an operand comprising data loaded into the plurality of sense amplifier segments of the respective bank core circuit.

According to an aspect of the disclosure, a memory device includes: a plurality of banks, wherein each bank of the plurality of banks comprises: a plurality of sub cell blocks, wherein each of the plurality of sub cell blocks comprises a plurality of memory cells; a plurality of word lines; a plurality of bit lines; and a bank core circuit comprising: a row decoder connected to the plurality of memory cells via the plurality of word lines extending in a first horizontal direction; and a sense amplifier connected to the plurality of memory cells via the plurality of bit lines extending in a second horizontal direction crossing the first horizontal direction, wherein the sense amplifier comprises a plurality of sense amplifier segments correspondingly connected to the plurality of sub cell blocks; a plurality of sub core circuits correspondingly connected to the plurality of sub cell blocks; and a first processing element connected to the plurality of sense amplifier segments and arranged in the first horizontal direction and configured to perform a logical operation on an operand comprising data loaded into the plurality of sense amplifier segments, wherein for each bank of the plurality of banks, the plurality of sub cell blocks form a cell array structure, and the bank core circuit forms a core peripheral circuit structure, and wherein for each respective bank of the plurality of banks, the cell array structure of the respective bank is disposed on the core peripheral circuit structure of the respective bank and overlaps the core peripheral circuit structure of the respective bank in a vertical direction.

According to an aspect of the disclosure, a memory device includes: a buffer die comprising an interface circuit configured to control data input and data output of the memory device; and a memory die stack disposed on the buffer die and comprising a stack of a plurality of memory dies, wherein each of the plurality of memory dies comprises: a plurality of banks, wherein each bank of the plurality of banks comprises: a plurality of sub cell blocks, wherein each of the plurality of sub cell blocks comprises a plurality of memory cells; a plurality of word lines; a plurality of bit lines; and a bank core circuit comprising: a row decoder connected to the plurality of memory cells via the plurality of word lines extending in a first horizontal direction, wherein the row decoder comprises a plurality of sub word line driver segments; a sense amplifier connected to the plurality of memory cells via the plurality of bit lines extending in a second horizontal direction crossing the first horizontal direction, wherein the sense amplifier comprises a plurality of sense amplifier segments; and a plurality of sub core circuits comprising a first processing element, a sub word line driver segment of the plurality of sub word line driver segments, and a sense amplifier segment of the plurality of sense amplifier segments, wherein the first processing element and the sense amplifier segment of each sub core circuit of the plurality of sub core circuits are connected, wherein the plurality of sub core circuits of a given bank of the plurality of banks are correspondingly connected to the plurality of sub cell blocks of the given bank of the plurality of banks, wherein for each bank of the plurality of banks, the plurality of sub cell blocks form a cell array structure, and the bank core circuit forms a core peripheral circuit structure, wherein for each respective bank of the plurality of banks, the cell array structure of the respective bank is disposed on the core peripheral circuit structure of the respective bank and overlaps the core peripheral circuit structure of the respective bank in a vertical direction, and wherein each sub core circuit of the plurality of sub core circuits of each respective bank of the plurality of banks is configured to perform a logical operation on an operand comprising data loaded into the plurality of sense amplifier segments of the respective bank core circuit.

According to an aspect of the disclosure, a memory device includes: a plurality of banks, wherein each bank of the plurality of banks comprises: a plurality of word lines; a plurality of bit lines; a plurality of memory cells formed at points where the plurality of word lines intersect with the plurality of bit lines; and a plurality of sub core circuits comprising a sub word line driver, a sense amplifier, and a processing element, wherein the processing element and the sense amplifier are connected, wherein the plurality of sub core circuits are connected to the plurality of memory cells by the plurality of word lines, the plurality of bit lines, or any combination thereof, wherein the plurality of memory cells are arranged in a cell array structure, and wherein the cell array structure is disposed on, and vertically stacked upon, the plurality of sub core circuits, and wherein each sub core circuit of the plurality of sub core circuits of each respective bank of the plurality of banks is configured to perform a logical operation on an operand comprising data loaded into the sense amplifier of the respective bank core circuit.

BRIEF DESCRIPTION OF THE DRAWINGS

The above and other aspects, features, and advantages of certain embodiments of the present disclosure will be more apparent from the following detailed description taken in conjunction with the accompanying drawings in which:

FIGS. 9, 10, 11, 12 and 13 are diagrams illustrating a sub core circuit architecture according to one or more embodiments;

DETAILED DESCRIPTION

Figure 1:
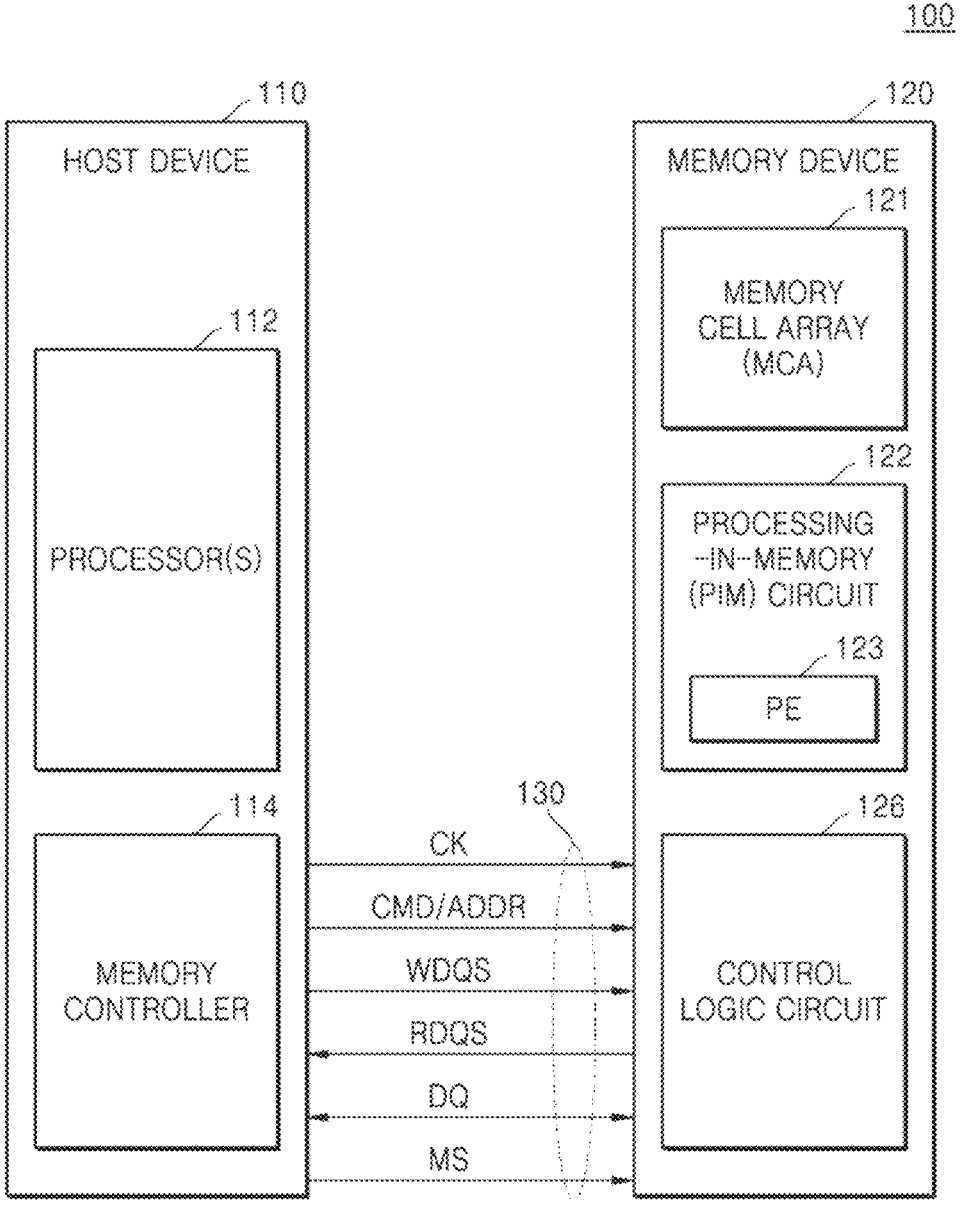
FIG. 1 is a diagram illustrating a system including a memory device that performs an internal processing operation, according to one or more embodiments.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" with or to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

Herein, the expression "at least one of a, b or c" indicates "only a," "only b," "only c," "both a and b," "both a and c," "both b and c," or "all of a, b, and c."

It will be understood that, although the terms first, second, third, etc., may be used herein to describe various elements, the disclosure should not be limited by these terms. These terms are only used to distinguish one element from another element.

As used herein, the singular forms "a," "an" and "the" are intended to include the plural forms as well, unless the context clearly indicates otherwise.

A processing element (PE) described herein may include one or more processing units, such as a neural processing unit (NPU), a central processing unit (CPU), a digital signal processor (DSP), a graphics processing unit (GPU), an encryption processing unit, a physics processing unit, a machine learning processing unit, etc., or logic circuits.

PEs may include various computational layers that perform processing-in-memory (PIM) operations. A first (for example, lowest) level in a computational layer may include bit vector operations (for example, fundamental logical operations referred to as "primitive" operations). A second (for example, middle) level in the computational layer may include complex operations including a plurality of bit vector operations. For example, the complex operations may include mathematical operations, such as addition, multiplication, etc., and may include a plurality of logic AND, OR, XOR or shift operations. A third (for example, highest) level in the computational layer may include control flow operations (for example, looping, branching, etc.) associated with program execution that involves performing processing using a PE 510. Hereinafter, in order to improve the performance of a compute-bound neural network and/or artificial intelligence (AI), there are provided PIM dynamic random access memory (DRAM) dies and PIM-high bandwidth memory (HBM) devices including the PIM DRAM dies.

FIG. 1 is a diagram illustrating a system including a memory device that performs an internal processing operation, according to one or more embodiments.

Referring to FIG. 1, a system 100 may be configured to execute applications such as high-performance computing, graphics operations, etc., or applications such as learning systems such as deep neural networks. These applications require extensive computational and memory capabilities to execute jobs or tasks cooperatively in parallel, train different data sets, and learn with high accuracy, and these applications place importance on power efficiency and low latency.

The system 100 may include a host device 110 and a memory device 120. The host device 110 may be used to solve an overall job or task by using a parallel processing approach in which the overall job or task is divided into smaller jobs that are executed in parallel by a large number of computing entities (for example, one or more processor(s) 112, cores in the one or more processor(s) 112, and a PIM circuit 122). A task includes a plurality of jobs organized in a hierarchical structure, etc., and a job may refer to executable code that has to be executed by a computing entity, data to be processed, and data to be retrieved from the memory device 120 by the computing entity, manipulated by executing the code, and then stored.

The host device 110 may be communicatively connected to the memory device 120 via a bus 130. The host device 110 may be, for example, a computing system, such as a computer, a laptop, a server, a workstation, a portable communication terminal, a personal digital assistant (PDA), a portable multimedia player (PMP), a smartphone, or a wearable device. Alternatively, the host device 110 may be a part of components included in a computing system, such as a graphics card.

The host device 110 may include the processor(s) 112 that performs general computer operations within the system 100, and a memory controller 114 that manages data transmission/reception to/from the memory device 120. The processor(s) 112 is a primary component of the system 100 that processes and manages instructions, and is mainly responsible for executing an operating system and applications. In addition, the processor(s) 112 may enable a workload to be distributed across a plurality of computing entities such that the workload is processed in parallel in order to solve complex jobs or tasks. The processor(s) 112 may include a processing unit, such as an NPU, a CPU, a DSP, a GPU, an encryption processing unit, a physics processing unit, a machine learning processing unit, etc.

The processor(s) 112 may improve efficiency by distributing execution of various computational operations, instructions, or kernels to other processors or offloading them to the memory device 120. A kernel is defined as one or more instructions that are grouped together to execute a task or a definable sub-task. The PIM circuit 122 of the memory device 120 may perform computational processing by a kernel offloaded by the processor(s) 112. Various types of computational processing operations may be performed by the PIM circuit 122. For example, at least some of neural network operations in relation to AI may be performed by the PIM circuit 122. For example, the processor(s) 112 may control the memory device 120 via the memory controller 114, such that at least some of neural network operations may be performed by the PIM circuit 122.

The memory controller 114 may access the memory device 120 according to a memory request of the host device 110. The memory controller 114 may control a write operation or a read operation with respect to the memory device 120 by providing a command CMD and an address ADDR to the memory device 120. In addition, data DQ for the write operation and read-out data DQ may be transmitted/received between the memory controller 114 and the memory device 120. Such a memory access operation may be performed via the bus 130 between the memory controller 114 and the memory device 120.

The bus 130 may include: clock signal lines to transmit a main clock signal CK, a write data strobe signal WDQS, and a read data strobe signal RDQS; command/address signal lines to transmit a command/address CMD/ADDR; data lines to transmit data DQ; and signal lines to transmit a mode selection signal MS. The mode selection signal MS may indicate the memory device 120 to operate in a memory mode or a processing mode. In the memory mode, a data transaction operation is performed between the memory controller 114 and the memory device 120 in response to first and second memory mode signals MMS1 and MMS2 to be described with reference to FIGS. 14 and 19, and in the data transaction operation, the memory device 120 may be controlled such that data is written to the memory device 120 or data written to the memory device 120 is read. In the processing mode, an internal processing operation of the memory device 120 may be performed in response to first and second processing mode signals PMS1 and PMS2 to be described with reference to FIGS. 14 and 19.

The bus 130 may operate in a PIM specification and/or in an HBM specification under control by the host device 110 (for example, the memory controller 114). For simplicity of drawings, it is illustrated that clock signal lines, command/address signal lines, and data lines are each connected as one signal line between the memory controller 114 and the memory device 120 but may actually be connected via a plurality of signal lines. The bus 130 may be implemented as one channel including a plurality of signal lines or a plurality of channels. The bus 130 may be referred to as a channel, and in the following embodiments, the terms "bus 130" and "channel" may be used interchangeably.

The memory device 120 may write or read data under control by the memory controller 114. For example, the memory device 120 may be a double data rate synchronous dynamic random access memory (DDR SDRAM) device. However, the disclosure is not limited thereto, and the memory device 120 may be one of volatile memory devices, such as lower power double data rate (LPDDR) SDRAM, wide I/O DRAM, HBM, a hybrid memory cube (HMC), etc. According to an embodiment, the memory device 120 may be one of non-volatile memory devices, such as flash memory, phase-change RAM (PRAM), magnetic RAM (MRAM), resistive RAM (RRAM), ferroelectric RAM (FRAM), etc.

The memory device 120 may operate in one of operation modes among a memory mode and an internal processing mode. The memory mode refers to an operation mode in which a general data transaction operation is performed under control by the memory controller 114, and the internal processing mode refers to an operation mode in which an internal processing operation is performed under control by the memory controller 114. In the data transaction operation, the memory device 120 may perform a command and address reception operation and a data exchange operation according to memory mode timing parameters set in DDR, LPDDR, and/or HBM protocols under control by the memory controller 114. In the internal processing operation, the memory device 120 may perform a command and address reception operation and a data exchange operation according to internal processing mode timing parameters set in PIM protocols under control by the memory controller 114. The memory mode timing parameters and the internal processing mode timing parameters may be set differently from each other. According to an embodiment, the internal processing mode timing parameters may be set as values relatively smaller than those of the memory mode timing parameters.

The memory device 120 may include a memory cell array (MCA) 121, the PIM circuit 122, a control logic circuit 126. The MCA 121 may be organized into banks and may include a plurality of word lines, a plurality of bit lines, and a plurality of memory cells formed at points where the word lines intersect with the bit lines. Each of the plurality of memory cells may include a DRAM cell MC (FIG. 8) including one access transistor and one storage capacitor.

The PIM circuit 122 may include at least one PE 123 configured to execute a kernel offloaded by the host device 110. The host device 110 (for example, the memory controller 114) may initiate an internal processing operation of the PIM circuit 122 by issuing a PIM command via the bus 130. Similar to the processor(s) 112 included in the host device 110, the PIM circuit 122 is hardware having a processing function. When the PIM circuit 122 is referred to as an internal processor, the term "internal" means existing inside the memory device 120. Therefore, a processor existing "outside" the memory device 120 may refer to, for example, the processor(s) 112 of the host device 110.

The control logic circuit 126 may control all operations of the memory device 120. The control logic circuit 126 may generate control signals to perform a write operation, read operation, refresh operation, and/or internal processing operation of the memory device 120, based on the command CMD and/or mode selection signal MS received from the memory controller 114.

Figure 2:
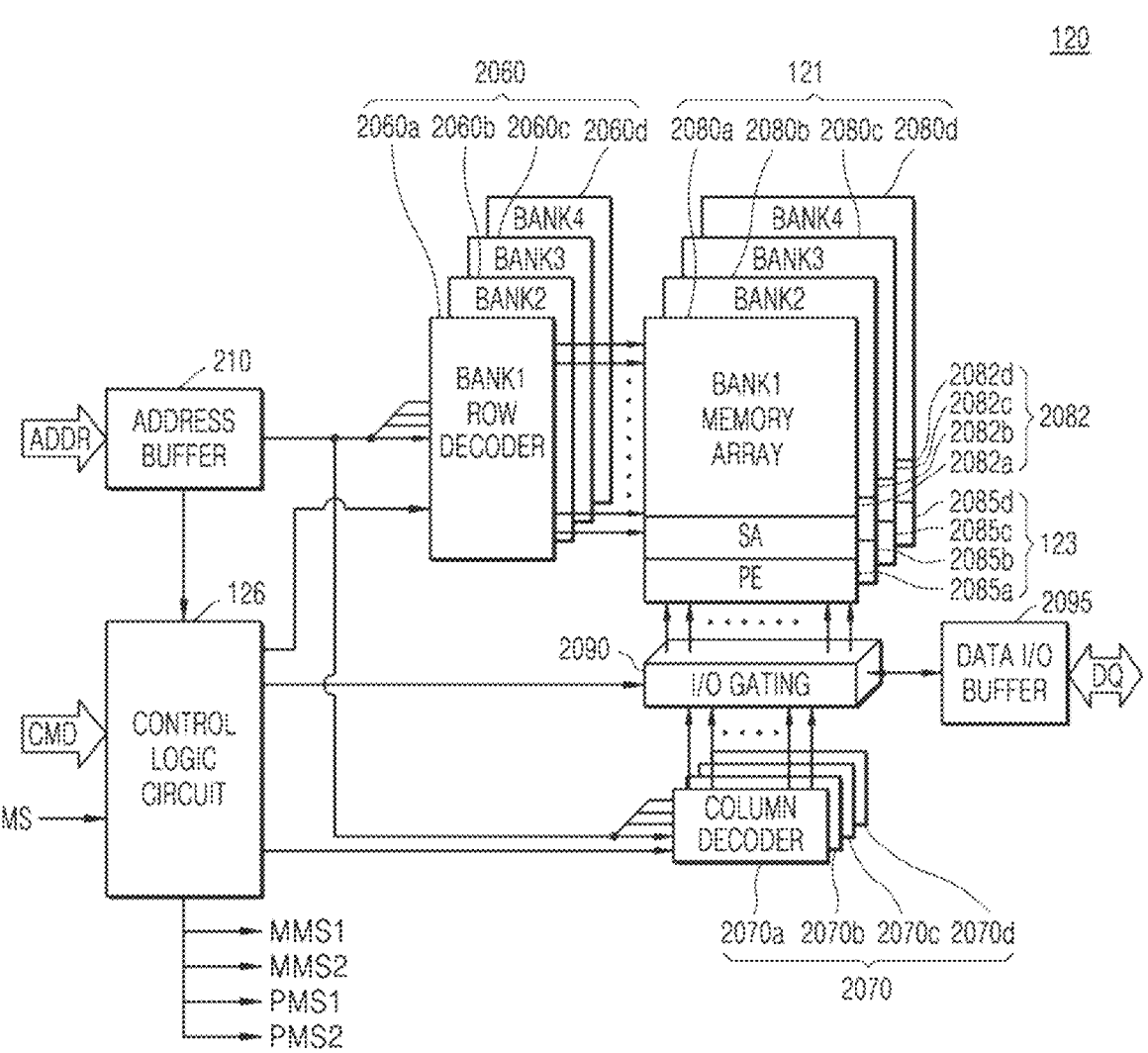
FIG. 2 is a block diagram illustrating the configuration of a memory device according to one or more embodiments.

FIG. 2 is a block diagram illustrating the configuration of a memory device according to an embodiment. FIG. 2 shows the configuration of the memory device 120 of FIG. 1.

Referring to FIG. 2, the memory device 120 may include an address buffer 210, the control logic circuit 126, a row decoder 2060, a column decoder 2070, a memory cell array 121, a sense amplifier 2082, the PIM circuit 122, an input/output gating circuit 2090, and a data input/output buffer 2095. The memory device 120 may further include a clock buffer, a refresh control circuit, a voltage generation circuit, a bank control logic, etc.

The memory cell array 121 may include first to fourth bank arrays 2080a, 2080b, 2080c, and 2080d. Each of the first to fourth bank arrays 2080a, 2080b, 2080c, and 2080d may include a plurality of word lines, a plurality of bit lines, and a plurality of memory cells formed at points where the word lines intersect with the bit lines.

The row decoder 2060 may include first to fourth bank row decoders 2060a, 2060b, 2060c, and 2060d respectively connected to the first to fourth bank arrays 2080a, 2080b, 2080c, and 2080d, and the column decoder 2070 may include first to fourth bank column decoders 2070a, 2070b, 2070c, and 2070d respectively connected to the first to fourth bank arrays 2080a, 2080b, 2080c, and 2080d. The sense amplifier 2082 may include first to fourth sense amplifiers 2082a, 2082b, 2082c, and 2082d respectively connected to the first to fourth bank arrays 2080a, 2080b, 2080c, and 2080d, and the PIM circuit 122 may include first to fourth PEs 2085a, 2085b, 2085c, and 2085d respectively connected to the first to fourth bank arrays 2080a, 2080b, 2080c, and 2080d.

The first bank array 2080a, the first bank row decoder 2060a, the first bank column decoder 2070a, the first sense amplifier 2082a, and the first PE 2085a may form a first bank BANK1. The second bank array 2080b, the second bank row decoder 2060b, the second bank column decoder 2070b, the second sense amplifier 2082b, and the second PE 2085b may form a second bank BANK2. The third bank array 2080c, the third bank row decoder 2060c, the third bank column decoder 2070c, the third sense amplifier 2082c, and the third PE 2085c may form a third bank BANK3. The fourth bank array 2080d, the fourth bank row decoder 2060d, the fourth bank column decoder 2070d, the fourth sense amplifier 2082d, and the fourth PE 2085d may form a fourth bank BANK4. The first to fourth bank row decoders 2060a, 2060b, 2060c, and 2060d, the first to fourth bank column decoders 2070a, 2070b, 2070c, and 2070d, the first to fourth sense amplifiers 2082a, 2082b, 2082c, and 2082d, and the first to fourth PEs 2085a, 2085b, 2085c, and 2085d may be referred to as core circuits of the first to fourth banks BANK1 to BANK4. In the present embodiment, an example of the memory device 120 including four banks is illustrated, but according to an embodiment, the memory device 120 may include various numbers of banks.

The address buffer 210 may receive the address ADDR including a row address (for example, RA<0:9>, FIG. 6A) and a column address from the memory controller 114. In addition, the address buffer 210 may receive a bank address and provide the bank address to the bank control logic, provide the received row address RA<0:9> to the row decoder 2060, and provide the received column address to the column decoder 2070. The bank control logic may generate bank control signals in response to the bank address. In response to the bank control signals, a bank row decoder corresponding to the bank address, among the first to fourth bank row decoders 2060a, 2060b, 2060c, and 2060d, may be activated, and a bank column decoder corresponding to the bank address, among the first to fourth bank column decoders 2070a, 2070b, 2070c, and 2070d, may be activated.

The control logic circuit 126 may control all operations of the memory device 120. The control logic circuit 126 may generate control signals to perform a write operation, read operation, refresh and/or internal processing operation of the memory device 120. The control logic circuit 126 may include a mode transistor for setting a plurality of operation options of the memory device 120, and a command decoder to decode the command CMD received from the memory controller 114. The control logic circuit 126 may generate the first memory mode signal MMS1, the second memory mode signal MMS2, the first processing mode signal PMS1, or the second processing mode signal PMS2 based on the mode selection signal MS received from the memory controller 114. Descriptions of the first and second memory mode signals MMS1 and MMS2 and the first and second processing mode signals PMS1 and PMS2 are made with reference to FIGS. 14, 18, and 19.

The input/output gating circuit 2090 may include, together with circuits to gate input/output data DQ, a column selection circuit, an input data mask logic, read data latches for storing read data output from the first to fourth bank arrays 2080a, 2080b, 2080c, and 2080d, and a write driver for writing data to the first to fourth bank arrays 2080a, 2080b, 2080c, and 2080d.

Read data output from one of the first to fourth bank arrays 2080a, 2080b, 2080c, and 2080d may be sensed by the sense amplifier 2082 corresponding to one bank array and stored in the read data latches. Write data to be written to one of the first to fourth bank arrays 2080a, 2080b, 2080c, and 2080d of the memory cell array 121 may be provided from the memory controller 114 to the data input/output buffer 2095. Data provided to the data input/output buffer 2095 may be written to one bank array via the write driver. The address buffer 210, the control logic circuit 126, the input/output gating circuit 2090, and the data input/output buffer 2095 may be referred to as peripheral circuits of the memory device 120.

Figure 3:
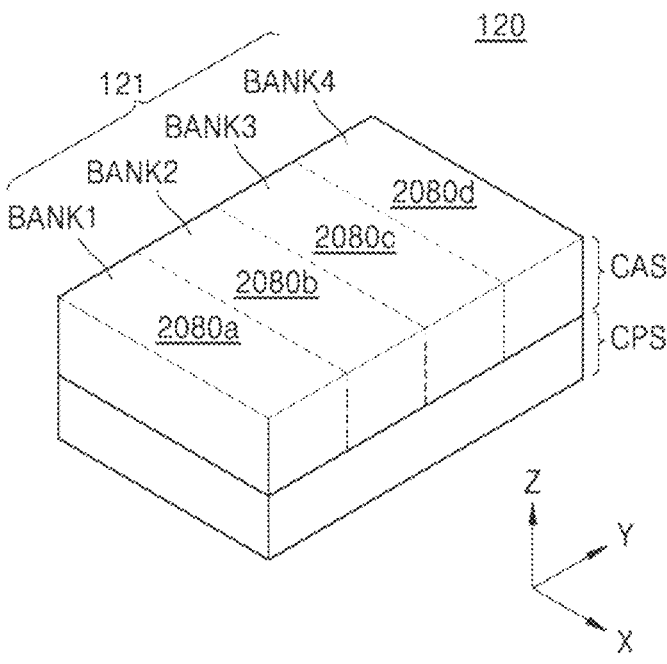
FIG. 3 is a diagram illustrating a semiconductor structure of the memory device of FIG. 2.

FIG. 3 is a diagram illustrating a semiconductor structure of the memory device 120 of FIG. 2.

Referring to FIG. 3, the memory device 120 may include a cell array structure CAS and a core peripheral circuit structure CPS, which overlap each other in a vertical direction (Z direction). The cell array structure CAS may include the memory cell array 121 of FIG. 2. The core peripheral circuit structure CPS may include the core circuits (for example, the first to fourth bank row decoders 2060a, 2060b, 2060c, and 2060d, the first to fourth bank column decoders 2070a, 2070b, 2070c, and 2070d, the first to fourth sense amplifiers 2082a, 2082b, 2082c, and 2082d, and the first to fourth PEs 2085a, 2085b, 2085c, and 2085d) of the first to fourth banks BANK1 to BANK4 of FIG. 2, and the peripheral circuits (for example, the address buffer 210, the control logic circuit 126, the input/output gating circuit 2090, and the data input/output buffer 2095) of the memory device 120.

The cell array structure CAS may include the first to fourth bank arrays 2080a, 2080b, 2080c, and 2080d. Each of the first to fourth bank arrays 2080a, 2080b, 2080c, and 2080d may include a plurality of memory cells each including a vertical channel transistor and a capacitor. The cell array structure CAS and the core peripheral circuit structure CPS are described in detail with reference to FIGS. 16A to 17C.

Figure 4:
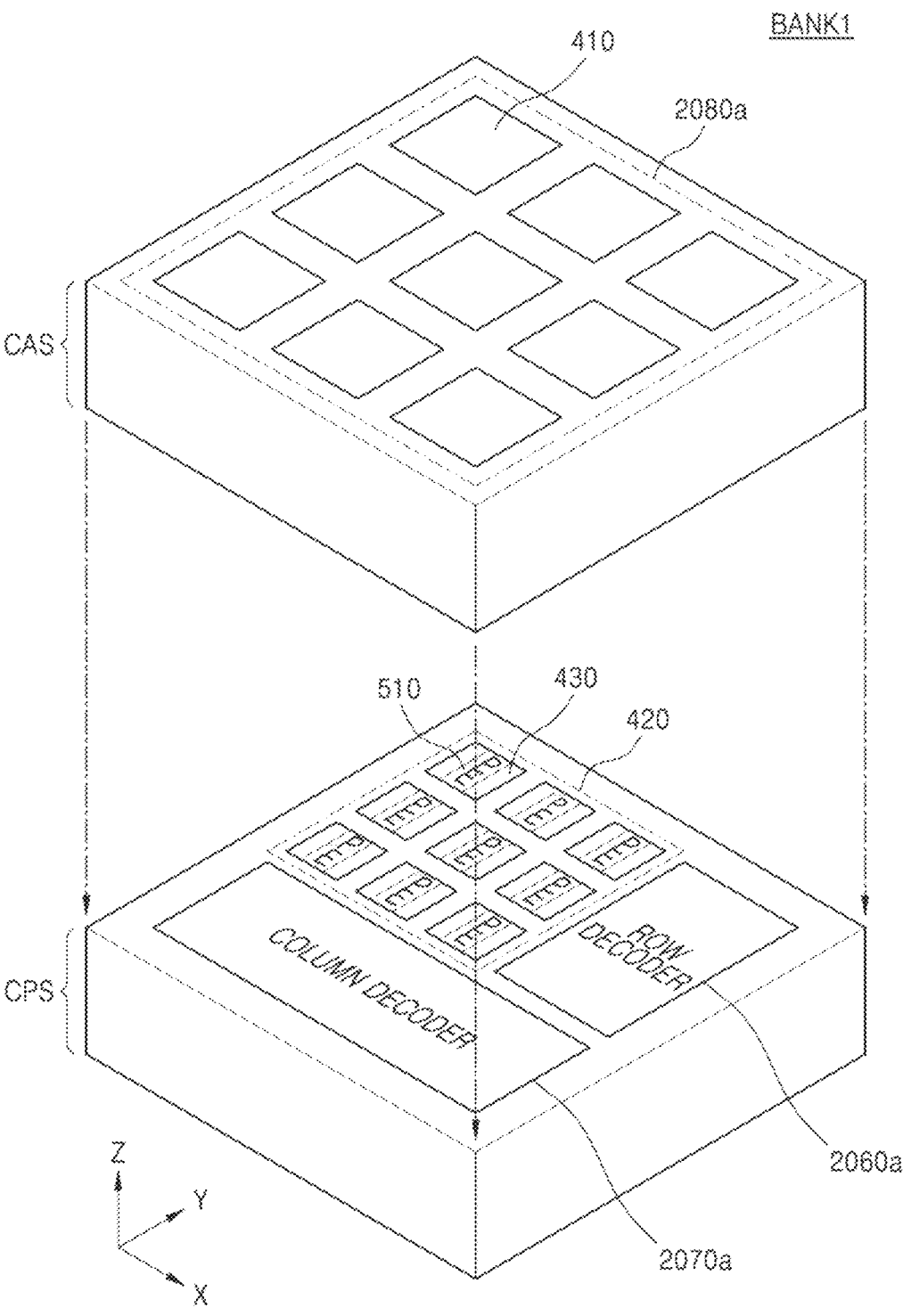
FIG. 4 is a diagram illustrating a semiconductor structure of a first bank in a memory cell array of FIG. 3.
Figure 5:
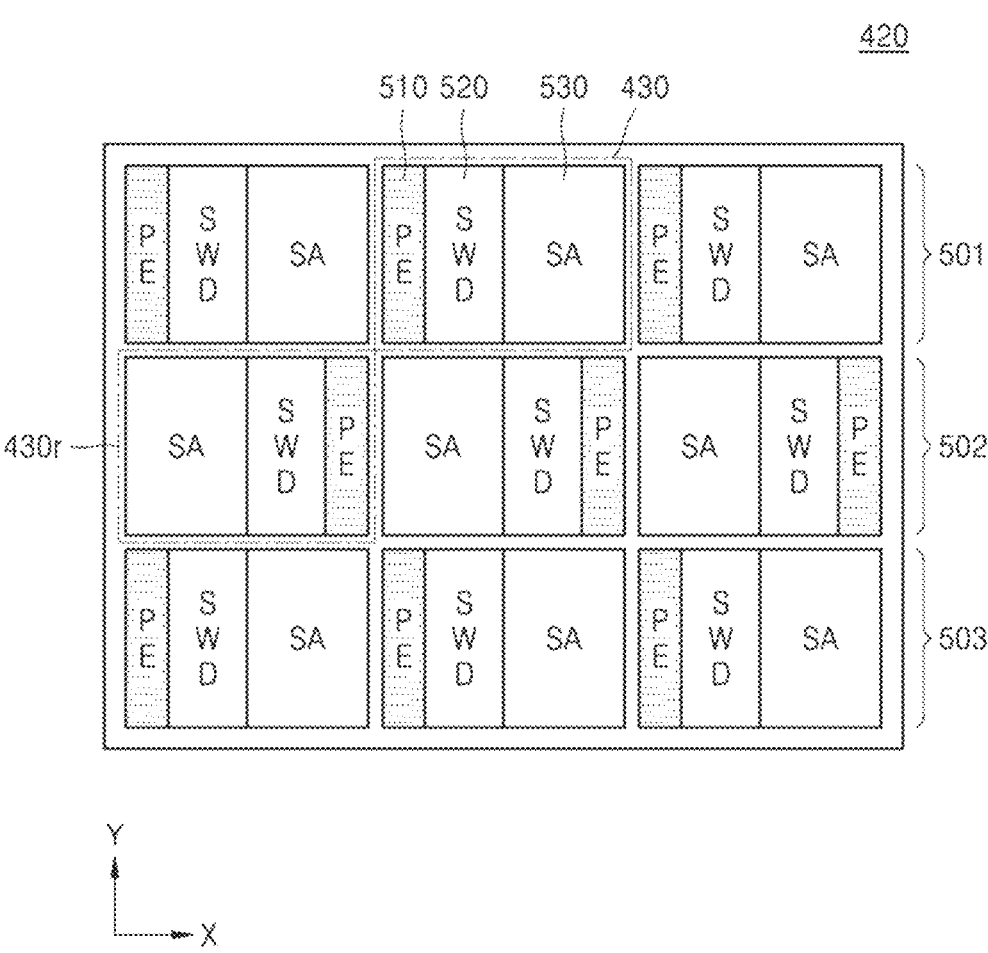
FIG. 5 is a diagram illustrating a sub core circuit architecture of FIG. 4.

FIGS. 4 and 5 are diagrams illustrating a semiconductor structure of the first bank BANK1 in the memory cell array 121. A semiconductor structure of the first bank BANK1 described with reference to FIG. 4 may be equally applied to the second to fourth banks BANK2 to BANK4. FIG. 5 is a diagram illustrating a sub core circuit architecture of FIG. 4.

Referring to FIG. 4, the cell array structure CAS may include a first bank array 2080a, and the first bank array 2080a may include a plurality of sub cell blocks 410. In an embodiment, the first bank array 2080a may be segmented three times in a first direction (X direction) and segmented three times in a second direction (Y direction) to form nine sub cell blocks 410, but the disclosure is not limited thereto, and the first bank array 2080a may include various numbers of sub cell blocks. For example, the first bank array 2080a may be segmented four or five times in the first direction (X direction) and the second direction (Y direction) to include 16 or 25 sub cell blocks 410. In embodiment, each sub cell block may include a plurality of memory cells.

The core peripheral circuit structure CPS may include a first bank core circuit 420, the first bank row decoder 2060a, and the first bank column decoder 2070a, and the first bank core circuit 420 may include a plurality of sub core circuits 430 that respectively correspond to the plurality of sub cell blocks 410 of the first bank array 2080a and partially overlap the plurality of sub cell blocks 410 in the vertical direction (Z direction). As shown in FIG. 5, each of the plurality of sub core circuits 430 may include a PE 510, a sub word line driver circuit 520, and a sense amplifier 530, each being associated with a corresponding sub cell block 410.

Referring to FIG. 5, each of sub core circuits 430 and 430r in the first bank core circuit 420 may include the PE 510, the sub word line driver circuit 520, and the sense amplifier 530. In a region of the sub core circuit 430, the PE 510, the sub word line driver circuit 520, and the sense amplifier 530 may be arranged adjacent to each other in this stated order in the first direction (X direction). In a region of the sub core circuit 430r, because the sub core circuits 430 are arranged to be symmetrical to each other with respect to the second direction (Y direction), the sense amplifier 530, the sub word line driver circuit 520, and the PE 510 may be arranged adjacent to each other in this stated order in the first direction (X direction). Three sub core circuits 430 may be arranged adjacent to each other in the first direction (X direction) in each of a first row 501 and a third row 503 in a region of the first bank core circuit 420. Three sub core circuits 430r may be arranged adjacent to each other in the first direction (X direction) in a second row 502 of the first bank core circuit 420. The PE 510 segmented and arranged in the regions of the sub core circuits 430 and 430r may be arranged between the sub word line driver circuit 520 and the sense amplifier 530. In the region of the first bank core circuit 420 including the sub core circuits 430 and 430r, the PEs 510 may be asymmetrically arranged in a windmill type.

In FIG. 5, the PE 510 of each of the regions of the sub core circuits 430 and 430r is connected with the sense amplifier 530 of the corresponding sub core circuits 430 and 430r, and may perform bit vector operations by using data loaded into the sense amplifier 530 as bits of an operand and/or store results of the operations in the plurality of sub cell blocks 410 of the first bank array 2080a. For example, various operations (for example, bit vector operations) may be performed by the PE 510 rather than by processing resources (for example, the processor(s) 112 associated with the host device 110 and/or other processing resources) outside the PE 510. Because the PE 510 may perform appropriate bit vector operations without using external processing resources, the PE 510 may be used to supplement and/or replace external processing resources at least to some extent. In addition, the number of memory reads (or loads) and memory writes (or stores) may be reduced in connection with performing logical operations by using the PE 510 connected with the sense amplifier 530, and accordingly, the efficiency of the memory device 120 may be increased and/or latency associated with the memory device 120 may be reduced.

Figure 6A:
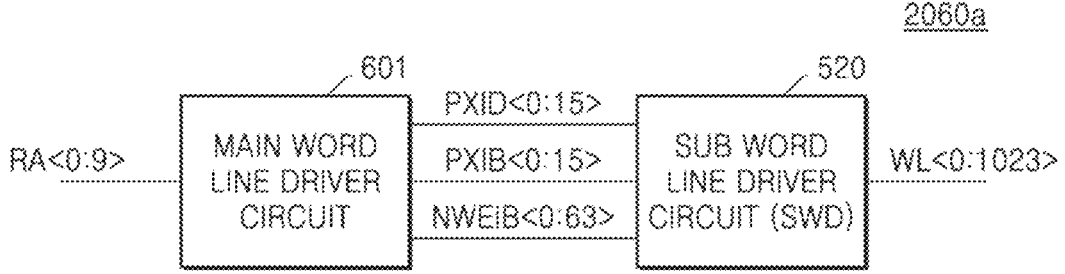
FIGS. 6A, 6B and 6C are diagrams illustrating a row decoder included in the sub core circuit of FIG. 5.
Figure 6B:
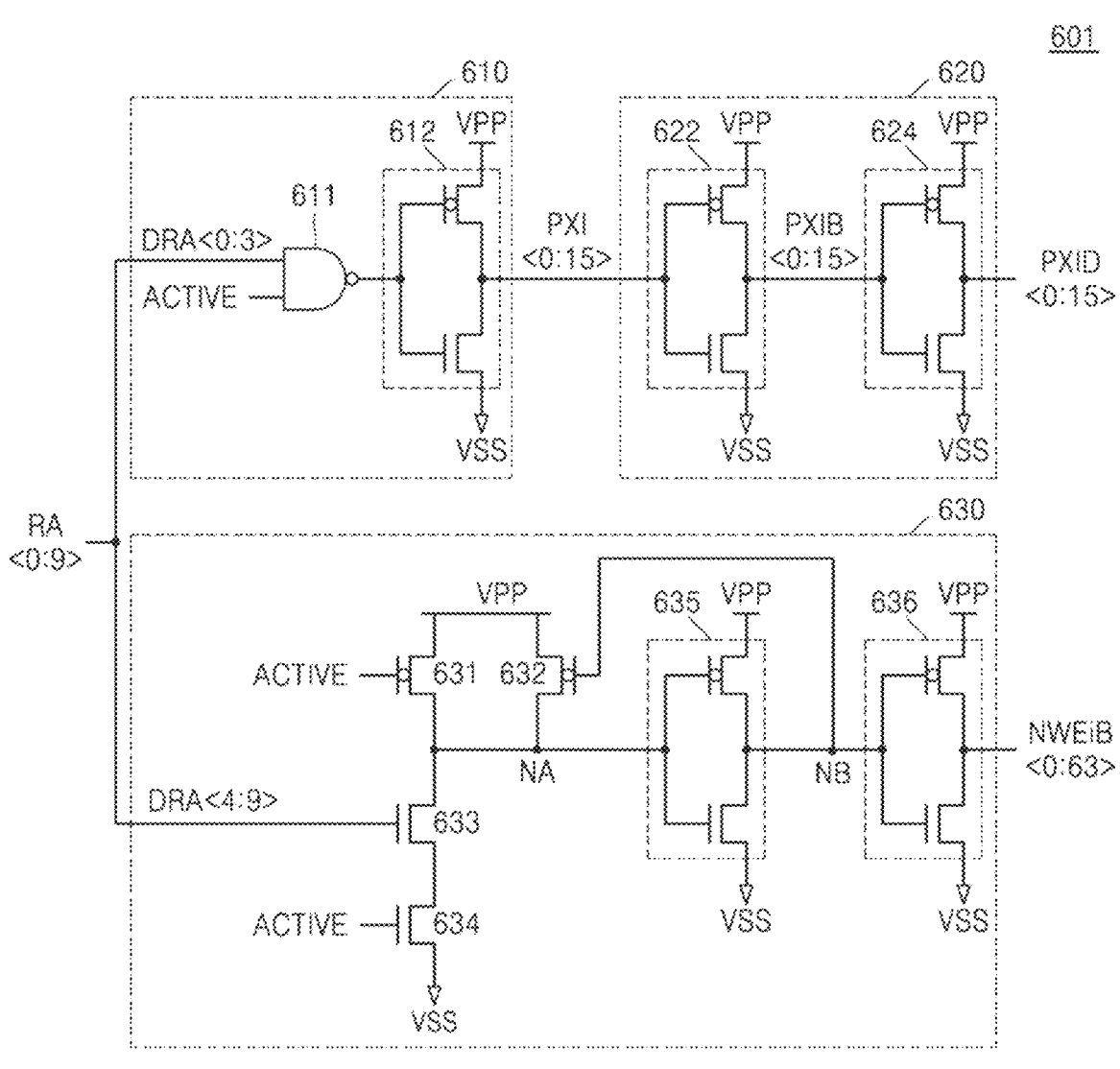
Figure 6C:
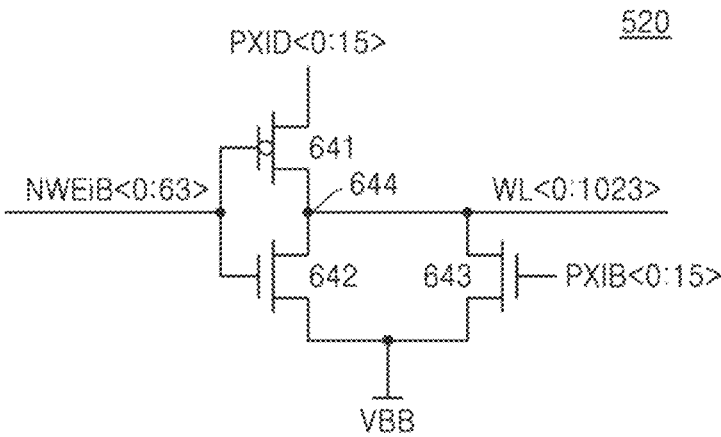

FIGS. 6A to 6C are diagrams illustrating the first bank row decoder 2060a included in the sub core circuit 430 of FIG. 5. The configuration of the first bank row decoder 2060a illustrated as an example in FIGS. 6A to 6C does not represent or imply any limitation to the disclosure.

Referring to FIG. 6A, the first bank row decoder 2060a may select a word line WL corresponding to a row address RA with respect to the first bank array 2080a and apply a word line driving voltage of a high voltage VPP to the selected word line WL. In the following embodiments, for convenience of explanation, the first bank array 2080a may include 1024 word lines WL, and the first bank row decoder 2060a may include a circuit configuration that decodes the row address RA<0:9> and selects one word line WL among the 1024 word lines WL. In an embodiment, the first bank array 2080a includes 1024 word lines according to the configuration of 10 row address RA<0:9> signals, but the disclosure is not limited thereto, and the first bank array 2080a may include various numbers of word lines. For example, the first bank array 2080a may include 2048 word lines or 4096 word lines according to the configuration of 11 row address RA<0:10> signals or 12 row address RA<0:11> signals.

The first bank row decoder 2060a may include a main word line driver circuit 601 and the sub word line driver circuit 520. The main word line driver circuit 601 may generate main word line driving signals NWEiB<0:63> based on signals of a most significant bit (MSB) group among the row address RA<0:9> signals. The signals of the MSB group among the row address RA<0:9> signals may be set as an RA<4:9> row address. The sub word line driver circuit 520 may generate sub word line driving signals PXID<0:15> and PXIB <0:15> based on signals of a least significant bit (LSB) group among the row address RA<0:9> signals. The signals of the LSB group among the row address RA<0:9> signals may be set as an RA<0:3> row address.

Referring to FIG. 6B, the main word line driver circuit 601 may include a sub word line signal generation circuit 610, a sub word line driving signal generation circuit 620, and a main word line driving signal generation circuit 630.

The sub word line signal generation circuit 610 is driven by the high voltage VPP and a ground voltage VSS, and may include a NAND gate 611 and an inverter 612. The NAND gate 611 may receive an active signal ACTIVE and first decoded row address signals DRA<0:3> and provide the output to the inverter 612. According to the output of the inverter 612, sub word line signals PXI<0:15> corresponding to the first decoded row address signals DRA<0:3> may be activated. The active signal ACTIVE is a control signal indicating that the first bank BANK1 is in an active mode, and may be provided from the control logic circuit 126 of the memory device 120 based on an active command. When the corresponding bank is in the active mode, the active signal ACTIVE may be provided at a logic high level, and when the corresponding bank is in a standby mode, the active signal ACTIVE may be provided at a logic low level. The first decoded row address signals DRA<0:3> may be signals obtained by decoding a row address signal RA<0:3> of lower 4 bits of a row address of the memory device 120. The first decoded row address signals DRA<0:3> may have 16 cases (i.e., 0000, 0001, 0010, 0011, 0100, 0101, 0110, 0111, 1000, 1001, 1010, 1011, 1100, 1101, 1110, and 1111), and thus, the sub word line signals PXI<0:15> to be activated may also have 16 cases. In other words, according to the first decoded row address signals DRA<0:3>, one of the PXI<0>, PXI<1>, PXI<2>, PXI<3>, PXI<4>, PXI<5>, PXI<6>, PXI<7>, PXI<8>, PXI<9>, PXI<10>, PXI<11>, PXI<12>, PXI<13>, PXI<14>and PXI<15> sub word line signals may be activated.

The sub word line driving signal generation circuit 620 is driven by the high voltage VPP and the ground voltage VSS, and may include a first inverter 622 and a second inverter 624. The sub word line driving signal generation circuit 620 may receive the sub word line signals PXI<0:15>, the first inverter 622 outputs first sub word line driving signals PXIB <0:15>, and the second inverter 624 outputs second sub word line driving signals PXID<0:15>.

The main word line driving signal generation circuit 630 may receive the active signal ACTIVE and a second decoded row address signal DRA<4:9>. In the active mode, in response to the second decoded row address signal DRA<4:9>, the main word line driving signal generation circuit 630 may activate a main word line driving signal corresponding to the second decoded row address signal DRA<4:9> among the main word line driving signals NWEiB<0:63> at a logic low level of a ground voltage VSS level.

The main word line driving signal generation circuit 630 may include: first and second PMOS transistors 631 and 632 connected in parallel between a high voltage VPP line and a first node NA line; first and second NMOS transistors 633 and 634 connected in series between the first node NA line and a ground voltage VSS line; a first inverter 635 having its input connected to the first node NA line and its output provided to a second node NB line; and a second inverter 636 having its input connected to the second node NB line and its output connected to a main word line driving signal NWEiB<0:63> line. The first and second inverters 635 and 636 may be driven by the high voltage VPP and the ground voltage VSS.

The first PMOS transistor 631 and the second NMOS transistor 634 may operate in response to the active signal ACTIVE, and the first NMOS transistor 633 may operate in response to the second decoded row address signal DRA<4: 9>. The second PMOS transistor 632 may operate in response to a signal of the second node NB line. When the first bank BANK1 is in the active mode, according to the active signal ACTIVE at the logic high level and the second decoded row address signal DRA<4:9>, the first node NA line is at the ground voltage VSS level and the second node NB line is at a high voltage VPP level, and thus, the main word line driving signal NWEiB<0:63> corresponding to the second decoded row address signal DRA<4:9> may be at the ground voltage VSS level. When the first bank BANK1 is in the standby mode, according to the active signal ACTIVE at the logic low level, the first node NA line is at the high voltage VPP level and the second node NB line is at the ground voltage VSS level, and thus, the main word line driving signal NWEiB<0:63> may be at the high voltage VPP level.

Referring to FIG. 6C, the sub word line driver circuit 520 may be connected to the first bank array 2080a, and based on the main word line driving signal NWEiB<0:63>, the first sub word line driving signal PXIB<0:15>, and the second sub word line driving signal PXID<0:15>, which are provided from the main word line driver circuit 601, may select one word line among word lines WL<0:1023>and drive the selected word line at the high voltage VPP.

The sub word line driver circuit 520 may include first to third transistors 641 to 643. The first transistor 641 may include a PMOS transistor having a source connected to a second sub word line driving signal PXID<0:15> line, a drain connected to a connection node 644 of the first to third transistors 641 to 643, and a gate to which the main word line driving signal NWEIB<0:63> is applied. The second transistor 642 may include an NMOS transistor having a source connected to a negative voltage VBB line, a drain connected to the connection node 644 of the first to third transistors 641 to 643, and a gate to which the main word line driving signal NWEiB<0:63> is applied. The third transistor 643 may include an NMOS transistor having a source connected to the negative voltage VBB line, a drain connected to the connection node 644 of the first to third transistors 641 to 643, and a gate to which the first sub word line driving signal PXIB<0:15> is applied. The connection node 644 of the first to third transistors 641 to 643 may be connected to the word line WL<0:1023> of the first bank array 2080a.

The main word line driver circuit 601 is arranged in a region of the first bank row decoder 2060a shown in FIG. 4, and the sub word line driver circuit 520 may be designed to be segmented and arranged in the plurality of sub core circuits 430. As shown in FIG. 5, the sub word line driver circuit 520 segmented and arranged in one sub core circuit 430 may select word lines of the sub cell block 410 corresponding to the sub core circuit 430 and drive the selected word lines at the high voltage VPP.

Figures 7, 8:
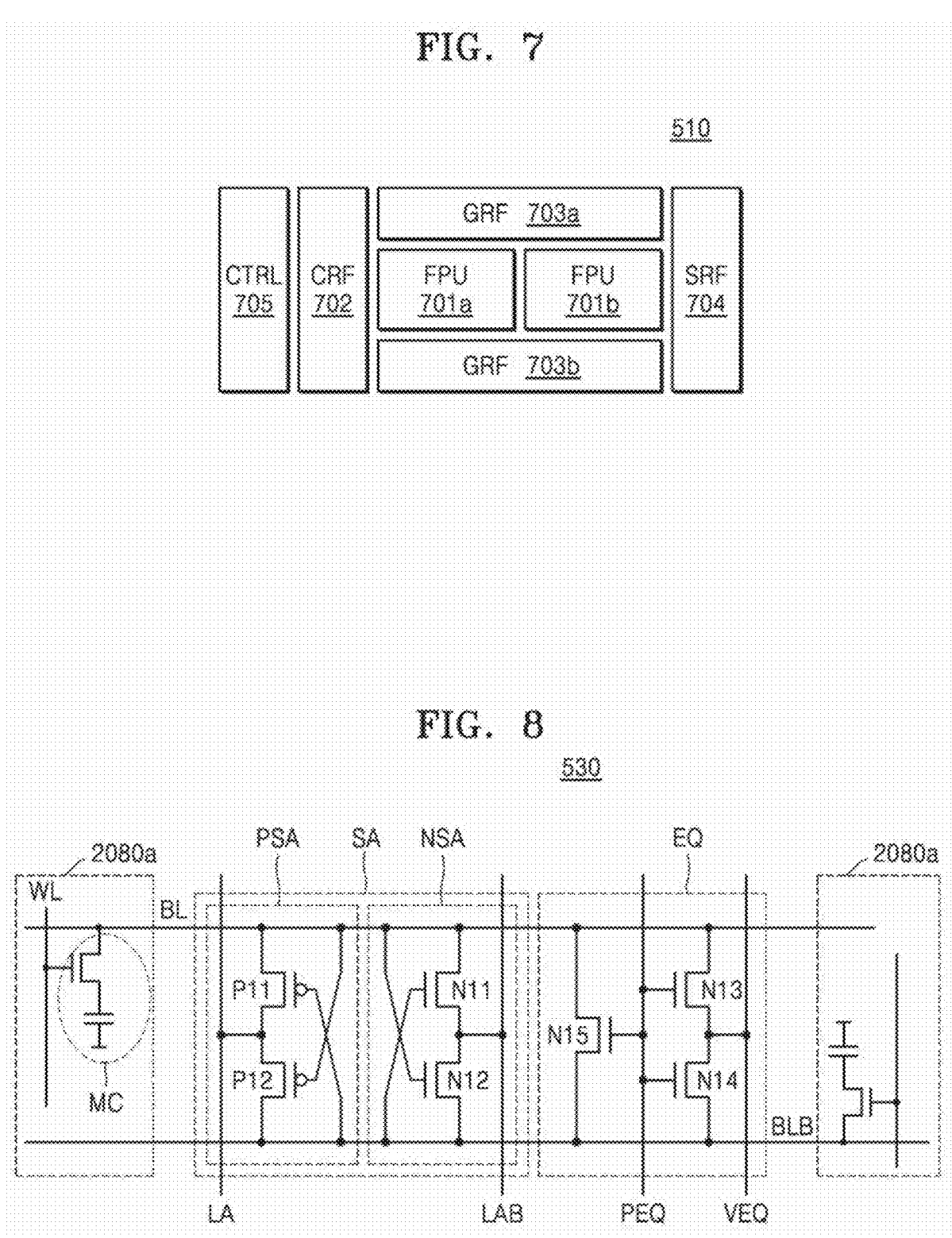
FIG. 7 is a diagram illustrating a processing element included in a sub core circuit of FIG. 5.
FIG. 8 is a diagram illustrating a sense amplifier included in the sub core circuit of FIG. 5.

FIG. 7 is a diagram illustrating the PE 510 included in the sub-core circuit of FIG. 5.

Referring to FIG. 7, the PE 510 may perform a bit vector operation. A bit vector may refer to a plurality of bits that are physically contiguous, wherein the plurality of bits may be physically contiguous in rows (for example, horizontally oriented) or may be physically contiguous in columns (for example, vertically oriented). Bit vector operations may include logical operations such as Boolean operations (for example, AND, OR, XOR, etc.), and transfer operations, for example, shifting and inverting data values in the sub cell block 410 of the first bank array 2080a. Arithmetic operations performed by the PE 510 may be enabled by the logical operations.

The PE 510 may include floating-point units (FPUs) 701a and 701b, a first register file 702 (e.g. Command Register File (CRF)), second register files 703a and 703b (e.g. General Register File (GRF)), a third register file 704 (e.g. Scalar Register File (SRF)), and a control unit 705. For example, the PE 510 may include a multiply-accumulate unit. The FPUs 701a and 701b may be calculation components including multipliers and adders. The register files may include the first register file 702 used as an instruction and/or address buffer, the second register files 703a and 703b that store data loaded from the sub cell block 410 of the first bank array 2080a, and the third register file 704 used for multiplications and additions. The control unit 705 may be responsible for controlling the flow of instructions stored in the first register file 702, fetching and decoding the instructions, and sequencing access to the sub cell block 410 of the first bank array 2080a. The control unit 705 includes a timing circuit and a timing management circuit, and may be responsible for executing instructions by controlling generation and application of clock signals with respect to calculation components in connection with performing bit vector operations.

The PE 510 may be designed to be segmented and arranged in the plurality of sub core circuits 430 of the first bank core circuit 420. As shown in FIGS. 5 and 9 to 13, the PE 510 is connected to the sense amplifier 530 and may perform various operations (for example, bit vector operations) on data loaded from the sub cell block 410 of the first bank array 2080a to the sense amplifier 530. The number of memory reads (or loads) and memory writes (or stores) may be reduced in connection with performing logical operations by using the PE 510 connected to the sense amplifier 530, and accordingly, the efficiency of the memory device 120 may be increased and/or latency associated with the memory device 120 may be reduced.

FIG. 8 is a diagram illustrating the sense amplifier 530 included in the sub core circuit 430 of FIG. 5.

Referring to FIG. 8, the sense amplifier 530 may be used to read (or load) data stored in the sub cell block 410 of the first bank array 2080a without transmitting data via address access (for example, without activating a column decode signal) and provide the data as inputs of the PE 510 to perform bit vector operations, and store results of the operations in the sub cell block 410 of the first bank array 2080a. The sense amplifier 530 may include a bit line sense amplifier circuit SA and a precharge and equalization circuit EQ. The bit line sense amplifier circuit SA may include a P-type sense amplifier PSA including PMOS transistors and an N-type sense amplifier NSA including NMOS transistors.

The P-type sense amplifier PSA includes a first PMOS transistor P11 and a second PMOS transistor P12 connected in series between a bit line BL and a complementary bit line BLB. A first sensing driving voltage line LA is connected to sources of the first and second PMOS transistors P11 and P12, the complementary bit line BLB is connected to a gate of the first PMOS transistor P11, and the bit line BL is connected to a gate of the second PMOS transistor P12. The sizes of the first PMOS transistor P11 and the second PMOS transistor P12 may be the same or different from each other according to an embodiment. A first sensing driving voltage is supplied via the first sensing driving voltage line LA, and the first sensing driving voltage of the bit line sense amplifier circuit SA may be an internal power voltage supplied to operate the first bank array 2080a and may be a voltage generated by a voltage generation circuit inside the memory device 120. The P-type sense amplifier PSA connected to the first sensing driving voltage line LA supplies a high level voltage amplified in a data sensing and amplification operation of a memory cell connected to the bit line BL.

The N-type sense amplifier NSA may include a first NMOS transistor N11 and a second NMOS transistor N12 connected in series between the bit line BL and the complementary bit line BLB. A second sensing driving voltage line LAB is connected to sources of the first and second NMOS transistors N11 and N12, the complementary bit line BLB is connected to a gate of the first NMOS transistor N11, and the bit line BL is connected to a gate of the second NMOS transistor N12. The sizes of the first NMOS transistor N11 and the second NMOS transistor N12 may be the same or different from each other according to an embodiment. A second sensing driving voltage is supplied via the second sensing driving voltage line LAB, and the second sensing driving voltage of the bit line sense amplifier circuit SA may be the ground voltage VSS of the memory device 120. The N-type sense amplifier NSA connected to the second sensing driving voltage line LAB supplies a low level voltage amplified in a data sensing and amplification operation of a memory cell connected to the bit line BL.

The precharge and equalization circuit EQ equalizes the bit line BL and the complementary bit line BLB at a bit line precharge voltage VEQ level in response to an equalizing signal PEQ. The precharge and equalization circuit EQ includes: a third NMOS transistor N13 connected between a bit line precharge voltage VEQ line and the bit line BL; a fourth NMOS transistor N14 connected between the bit line precharge voltage VEQ line and the complementary bit line BLB; and a fifth NMOS transistor N15 connected between the bit line BL and the complementary bit line BLB. According to an embodiment, the precharge and equalization circuit EQ may include one of the third NMOS transistor N13 and the fourth NMOS transistor N14, and the fifth NMOS transistor N15.

Gates of the third to fifth NMOS transistors N13, N14, and N15 are connected to an equalizing signal PEQ line. The equalizing signal PEQ may be provided from the control logic circuit 126 based on the command CMD provided from the memory device 120. The equalizing signal PEQ is applied at a logic high level during a precharge operation of the bit line sense amplifier circuit SA, turns on the third to fifth NMOS transistors N13, N14, and N15, and precharges the bit line BL and the complementary bit line BLB at the bit line precharge voltage VEQ level. During a sensing operation, the equalizing signal PEQ is applied at a logic low level and turns off the third to fifth NMOS transistors N13 to N15.

The sense amplifier 530 of FIG. 8 may be connected to each of the plurality of sub cell blocks 410 of the first bank array 2080a of FIG. 4, and as shown in FIG. 5, may be segmented and arranged in the regions of the sub core circuits 430 and 430r of the first bank core circuit 420 corresponding to the plurality of sub cell blocks 410. The PE 510 may perform various operations (for example, bit vector operations) on data loaded from the sub cell block 410 of the first bank array 2080a to the sense amplifier 530.

FIGS. 9 to 13 are diagrams illustrating a sub core circuit architecture according to one or more embodiments. Hereinafter, subscripts (for example, "a" of 430a and "b" of 430b) added to reference numerals are for distinguishing a plurality of circuits performing the same function. Hereinafter, descriptions of sub core circuits 430a, 430b, 430c, 430d, and 430e, which are the same as the descriptions of the sub core circuit 430 of FIG. 5, are omitted.

Figure 9:
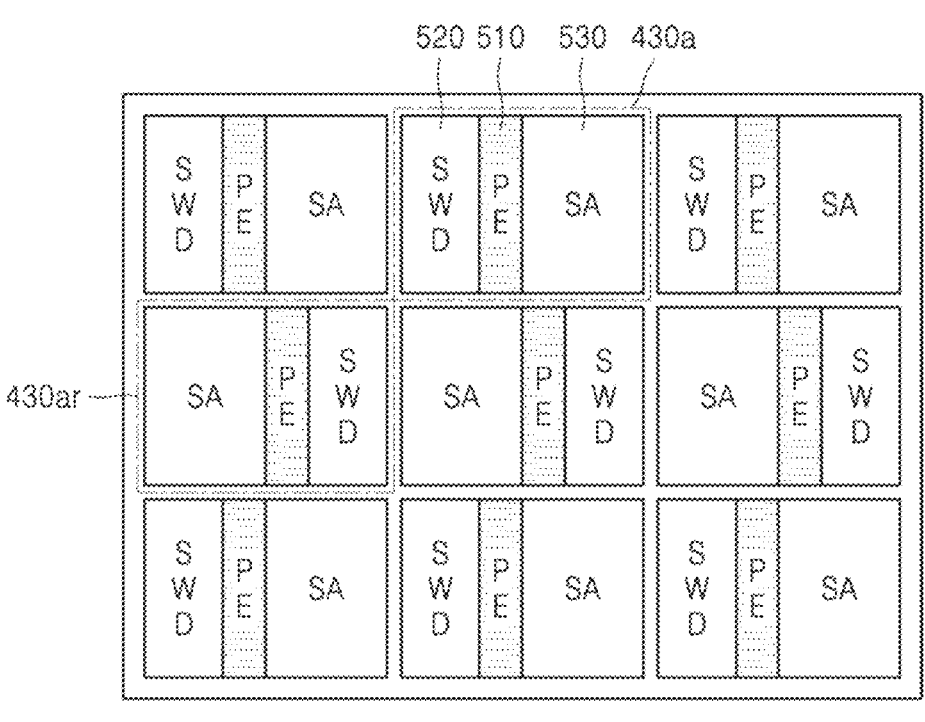
Figure 9:

Referring to FIGS. 4 and 9, each of a plurality of sub core circuits 430a and 430ar in the first bank core circuit 420 may include the PE 510, the sub word line driver circuit 520, and the sense amplifier 530. In a region of the sub core circuit 430a, the sub word line driver (SWD) circuit 520, the PE 510, and the sense amplifier 530 may be arranged adjacent to each other in this stated order in the first direction (X direction). In a region of the sub core circuit 430ar, because regions of the sub core circuits 430a are arranged to be symmetrical to each other with respect to the second direction (Y direction), the sense amplifier 530, the PE 510, and the sub word line driver circuit 520 may be arranged adjacent to each other in this stated order in the first direction (X direction). The PE 510 segmented and arranged in the regions of the sub core circuits 430a and 430ar may be arranged between the sub word line driver circuit 520 and the sense amplifier 530. In a region of the first bank core circuit 420 including the sub core circuits 430a and 430ar, the PE 510 may be asymmetrically arranged in a windmill type.

Figure 10:
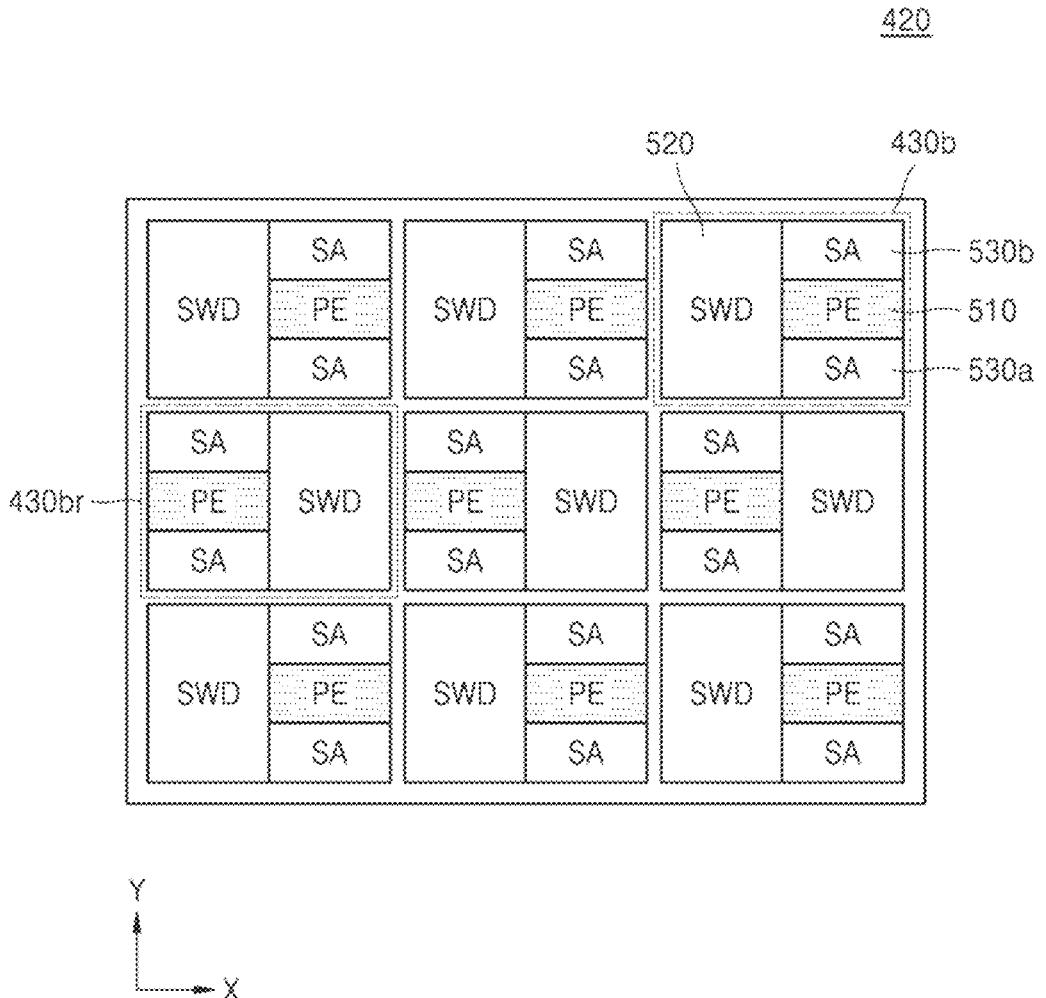

Referring to FIGS. 4 and 10, each of a plurality of sub core circuits 430b and 430br in the first bank core circuit 420 may include the PE 510, the sub word line driver circuit 520, and sense amplifiers 530a and 530b. In a region of the sub core circuit 430b, because the PE 510 is arranged between the sense amplifiers 530a and 530b, the sense amplifier 530a, the PE 510, and the sense amplifier 530b may be arranged adjacent to each other in this stated order in the second direction (Y direction). In the region of the sub core circuit 430b, the sub word line driver circuit 520 and the PE 510 between the sense amplifiers 530a and 530b may be arranged adjacent to each other in the first direction (X direction). In a region of the sub core circuit 430br, because regions of the sub core circuits 430b are arranged to be symmetrical to each other with respect to the second direction (Y direction), the PE 510 between the sense amplifiers 530a and 530b and the sub word line driver circuit 520 may be arranged adjacent to each other in this stated order in the first direction (X direction). The PE 510 segmented and arranged in the regions of the sub core circuits 430b and 430br may be arranged between the sub word line driver circuits 520 and between the sense amplifiers 530a and 530b. In a region of the first bank core circuit 420 including the sub core circuits 430b and 430br, the PE 510 may be asymmetrically arranged in a windmill type.

Figure 11:
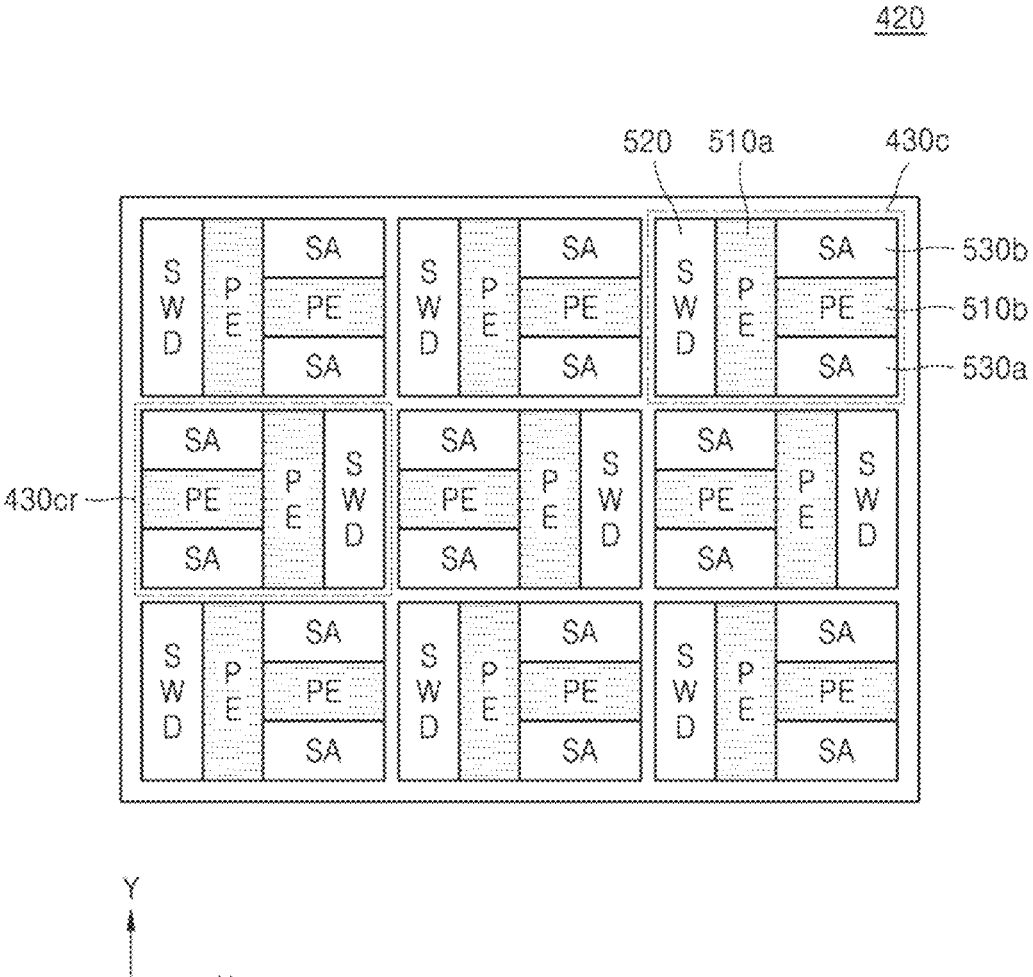

Referring to FIGS. 4 and 11, each of a plurality of sub core circuits 430c and 430cr in the first bank core circuit 420 may include first and second PEs 510a and 510b, the sub word line driver circuit 520, and the sense amplifiers 530a and 530b. In a region of the sub core circuit 430c, the sub word line driver circuit 520, the first PE 510a, and the second PE 510b between the sense amplifiers 530a and 530b may be arranged adjacent to each other in this stated order in the first direction (X direction). In a region of the sub core circuit 430cr, because regions of the sub core circuits 430c are arranged to be symmetrical to each other with respect to the second direction (Y direction), the second PE 510b between the sense amplifiers 530a and 530b, the first PE 510a, and the sub word line driver circuit 520 may be arranged adjacent to each other in this stated order in the first direction (X direction). The first and second PEs 510a and 510b segmented and arranged in the regions of the sub core circuits 430c and 430cr may be arranged between the sense amplifiers 530a and 530b and between the sub word line driver circuits 520. In a region of the first bank core circuit 420 including the sub core circuits 430c and 430cr, the PE 510 may be asymmetrically arranged in a windmill type.

Figure 12:
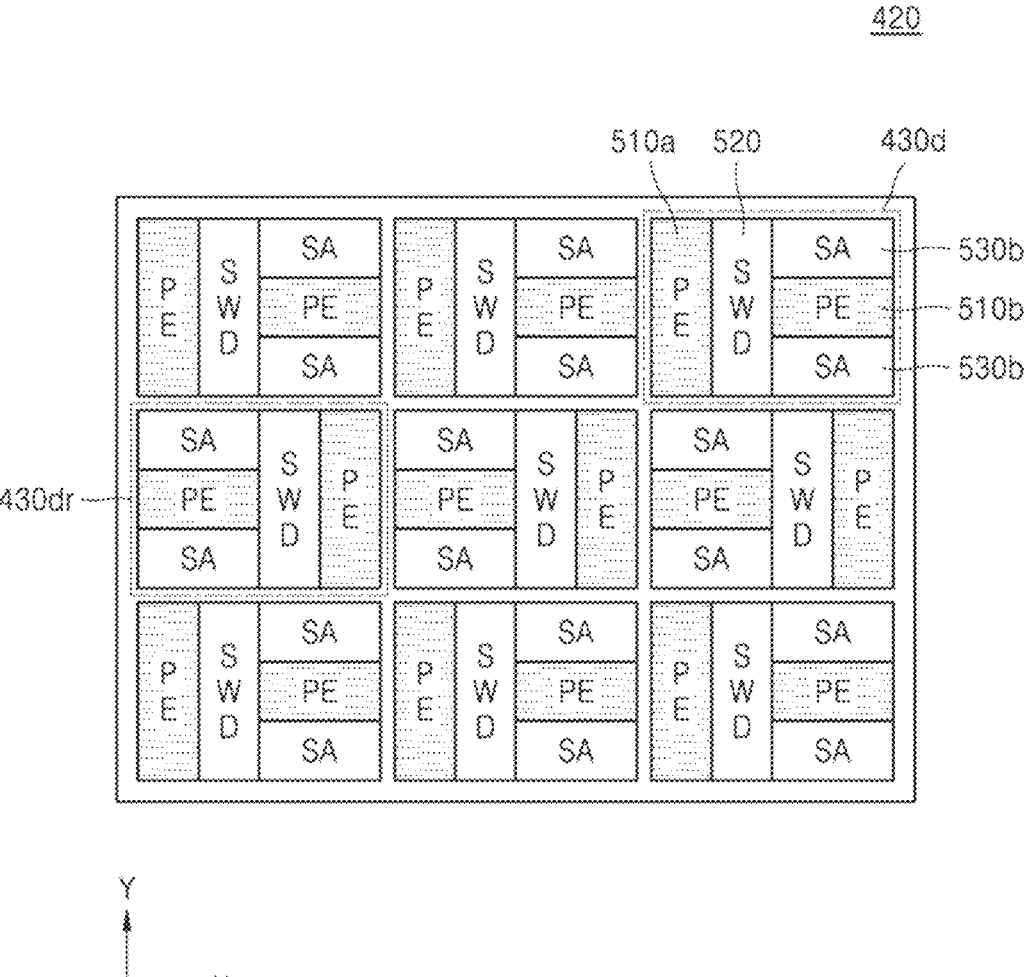

Referring to FIGS. 4 and 12, each of a plurality of sub core circuits 430d and 430dr in the first bank core circuit 420 may include the first and second PEs 510a and 510b, the sub word line driver circuit 520, and the sense amplifiers 530a and 530b. In a region of the sub core circuit 430d, the first PE 510a, the sub word line driver circuit 520, and the second PE 510b between the sense amplifiers 530a and 530b may be arranged adjacent to each other in this stated order in the first direction (X direction). In a region of the sub core circuit 430dr, because regions of the sub core circuits 430d are arranged to be symmetrical to each other with respect to the second direction (Y direction), the second PE 510b between the sense amplifiers 530a and 530b, the sub word line driver circuit 520, and the first PE 510a may be arranged adjacent to each other in this stated order in the first direction (X direction). The second PE 510b segmented and arranged in the regions of the sub core circuits 430d and 430dr may be arranged between the sense amplifiers 530a and 530b and between the sub word line driver circuits 520. In a region of the first bank core circuit 420 including the sub core circuits 430d and 430dr, the second PE 510b may be asymmetrically arranged in a windmill type.

Figure 13:
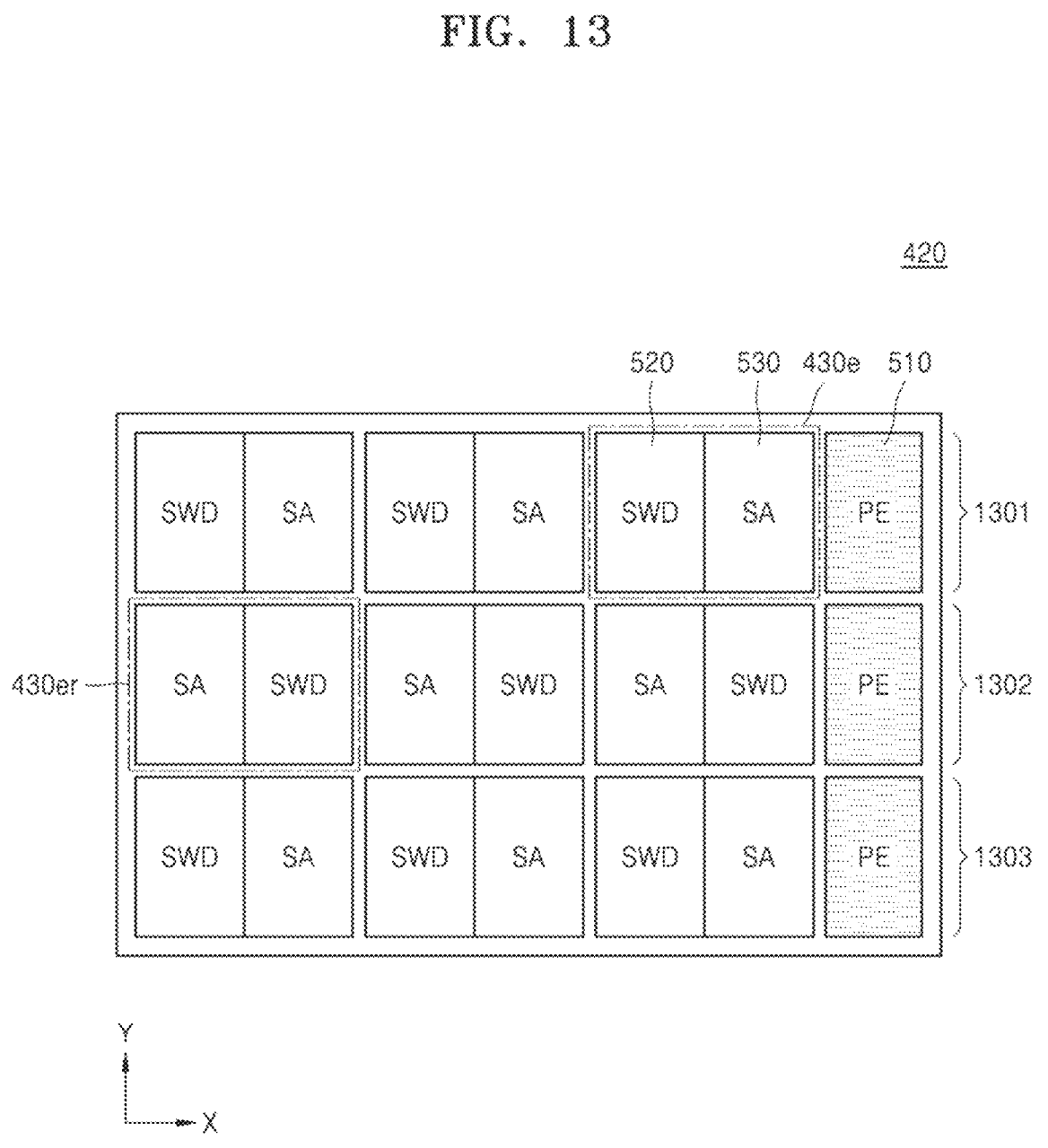

Referring to FIGS. 4 and 13, each of a plurality of sub core circuits 430e and 430er in the first bank core circuit 420 may include the sub word line driver circuit 520 and the sense amplifier 530. In a region of the sub core circuit 430e, the sub word line driver circuit 520 and the sense amplifier 530 may be arranged adjacent to each other in this stated order in the first direction (X direction). In a region of the sub core circuit 430er, because regions of the sub core circuits 430e are arranged to be symmetrical to each other with respect to the second direction (Y direction), the sense amplifier 530 and the sub word line driver circuit 520 may be arranged adjacent to each other in this stated order in the first direction (X direction). The PE 510 may be arranged in a region excluding the regions of the sub core circuits 430*e* and 430*er* from a region of the first bank core circuit 420. The PE 510 may be arranged at the edge of each of first to third rows 1301, 1302, and 1303 in the region of the first bank core circuit 420 in the first direction (X direction) and one PE 510 may be arranged in each of the first to third rows 1301, 1302, and 1303. The PE 510 connected to the sense amplifiers 530 included in each of the first to third rows 1301, 1302, and 1303 may perform various operations (for example, bit vector operations) on data loaded to the sense amplifiers 530 of each of the first to third rows 1301, 1302, and 1303. The number of memory reads (or loads) and memory writes (or stores) may be reduced in connection with performing logical operations by using the PE 510 connected to the sense amplifiers 530, and accordingly, the efficiency of the memory device 120 may be increased and/or latency associated with the memory device 120 may be reduced.

Figure 14:
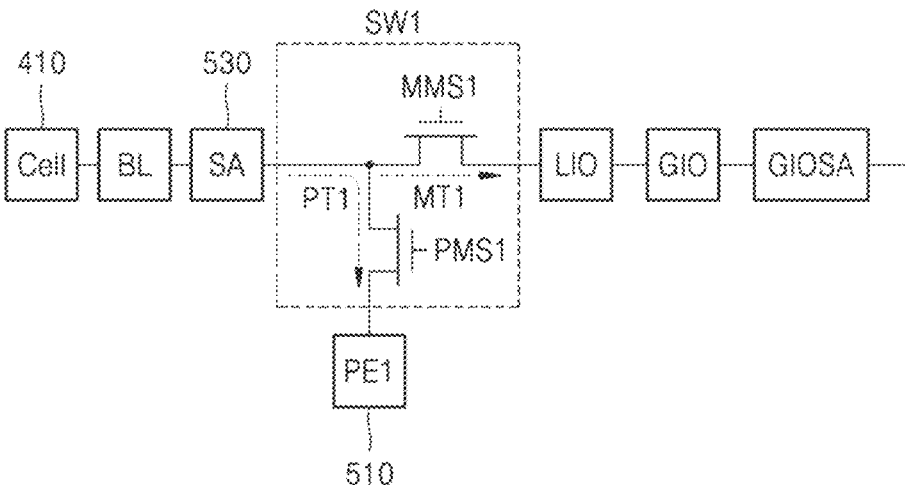
FIG. 14 is a diagram illustrating a data path of a memory device according to one or more embodiments.

FIG. 14 is a diagram illustrating a data path of a memory device according to one or more embodiments. FIG. 14 shows a data path associated with the sub core circuit 430 described with reference to FIGS. 4 to 13, and the data path of FIG. 14 may be the same as a data path associated with each of the sub core circuits 430*a* to 430*e* of FIG. 13.

Referring to FIG. 14, data read from the sub cell block 410 may be loaded into the sense amplifier 530 via the bit line BL. The data loaded into the sense amplifier 530 may be data of the bit line BL, which is sensed and amplified by the sense amplifier 530. The data loaded into the sense amplifier 530 may be transmitted to a first PE 510 or a local input/output line LIO via a first switch circuit SW1. In one or more embodiments, the sense amplifier 530 may include the first switch circuit SW1. The first switch circuit SW1 may include a first transistor PT1 connected between the sense amplifier 530 and the first PE 510 and a second transistor MT1 connected between the sense amplifier 530 and the local input/output line LIO. The first transistor PT1 may transmit the data loaded into the sense amplifier 530 to the first PE 510 in response to activation of the first processing mode signal PMS1. The first PE 510 may perform a bit vector operation on the data loaded into the sense amplifier 530 connected to one sub cell block 410 of the first bank array 2080*a*.

The second transistor MT1 may transmit the data loaded into the sense amplifier 530 to the local input/output line LIO in response to activation of the first memory mode signal MMS1. The data of the bit line BL, which is sensed by the sense amplifier 530, may be selectively transmitted to the local input/output line LIO by column-select transistors, and a local input/output line sense amplifier may amplify data of the local input/output line LIO. The data of the local input/output line LIO, which is amplified by the local input/output line sense amplifier, may be transmitted to a global input/output line GIO. The data of the global input/output line GIO may be transmitted to a global input/output line sense amplifier GIOSA. The global input/output line sense amplifier GIOSA may amplify data of a global input/output line pair and output the data as read data to the memory controller 114 (FIG. 1) outside the memory device 120 via a data DQ pad(s).

Figure 15:
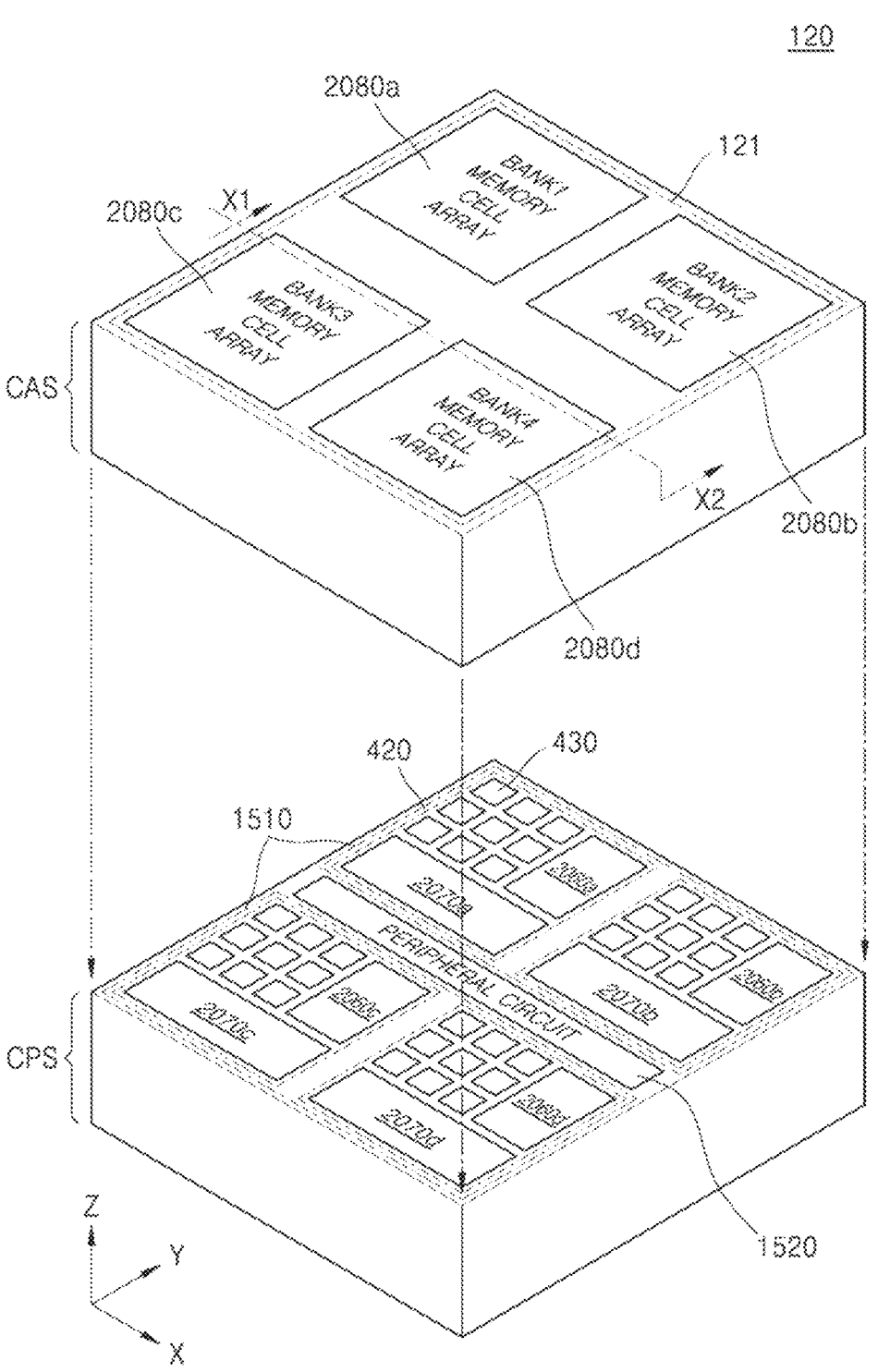
FIGS. 15, 16A, 16B, 16C, 17A, 17B and 17C are diagrams illustrating a semiconductor structure of a memory device according to one or more embodiments.
Figure 16A:
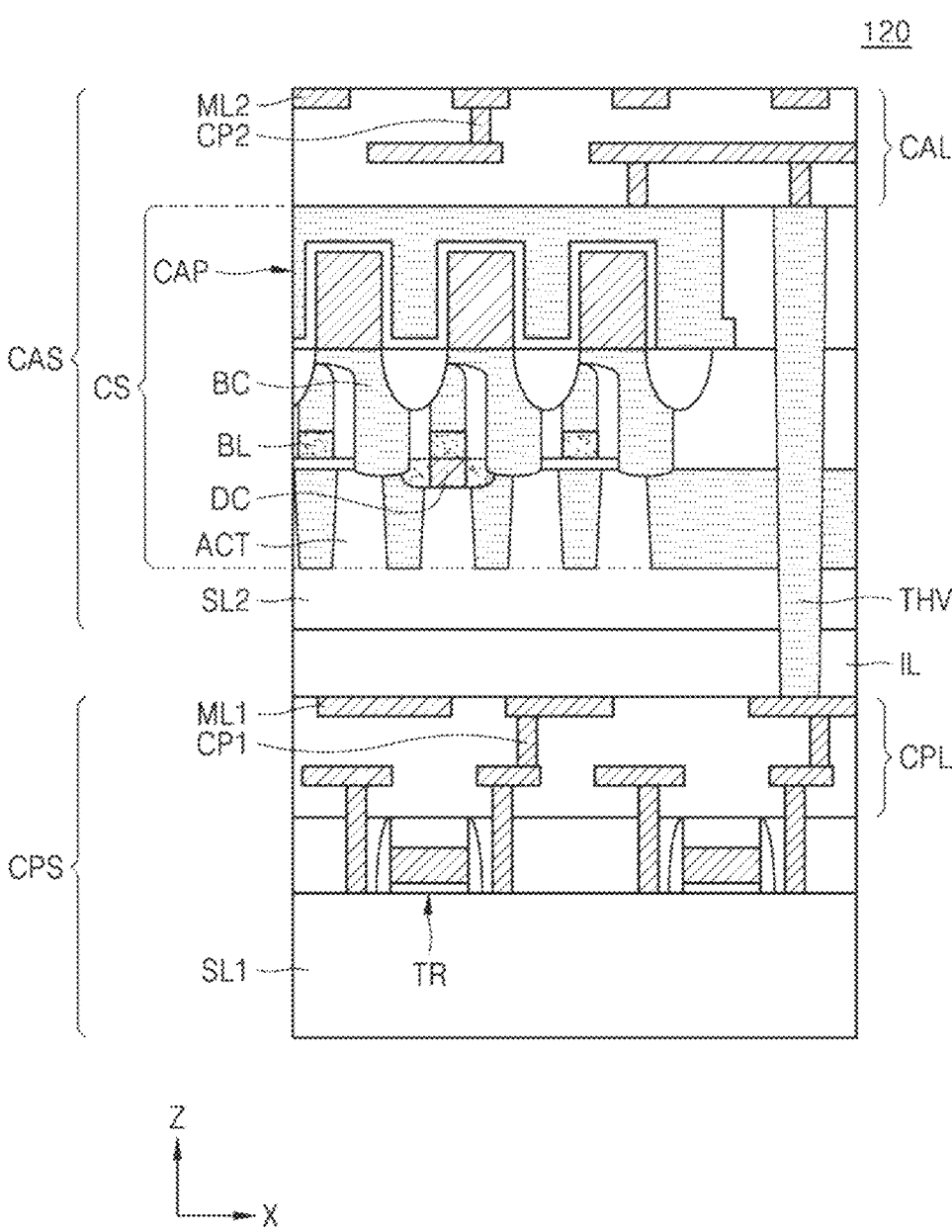
Figure 16B:
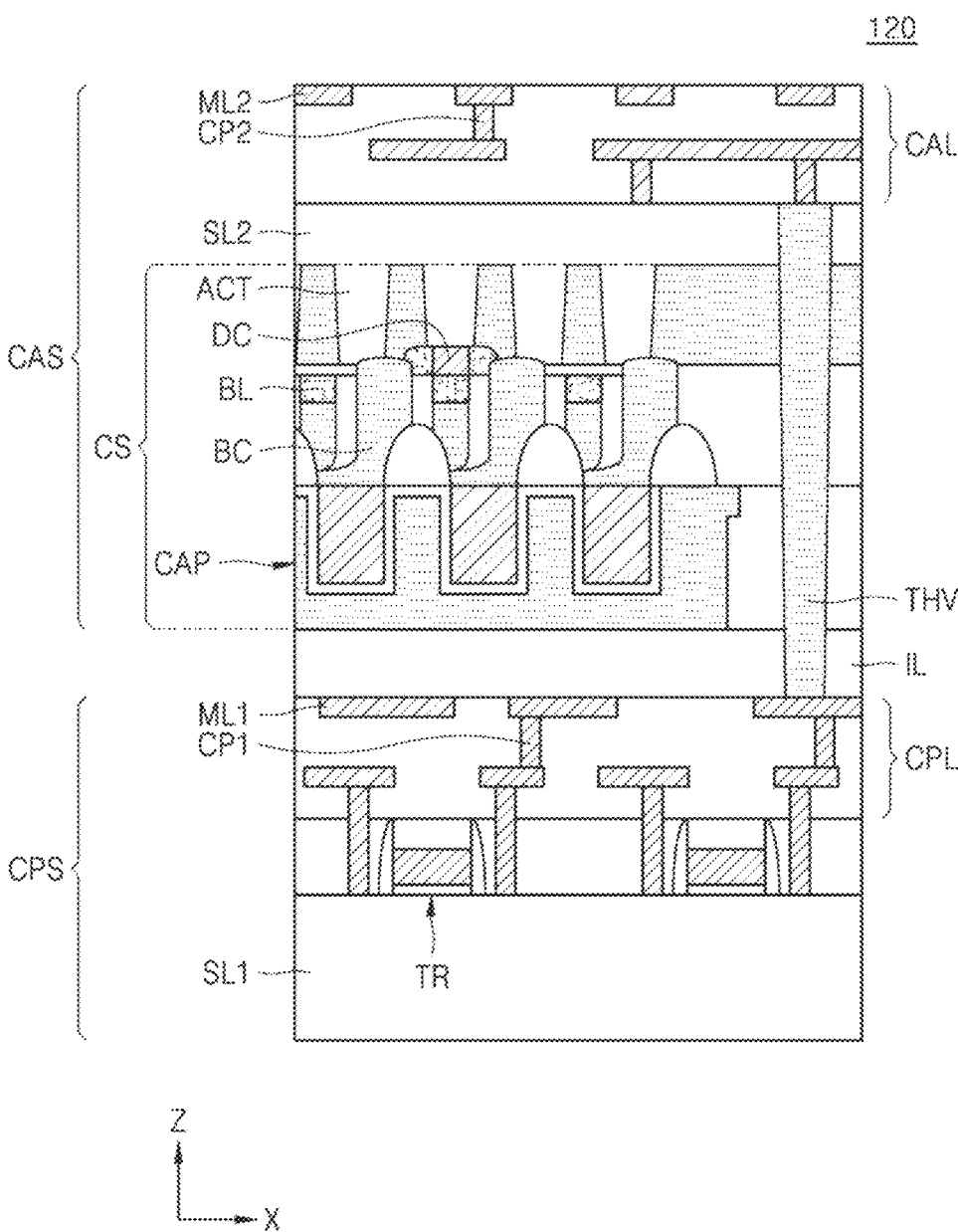
Figure 16C:
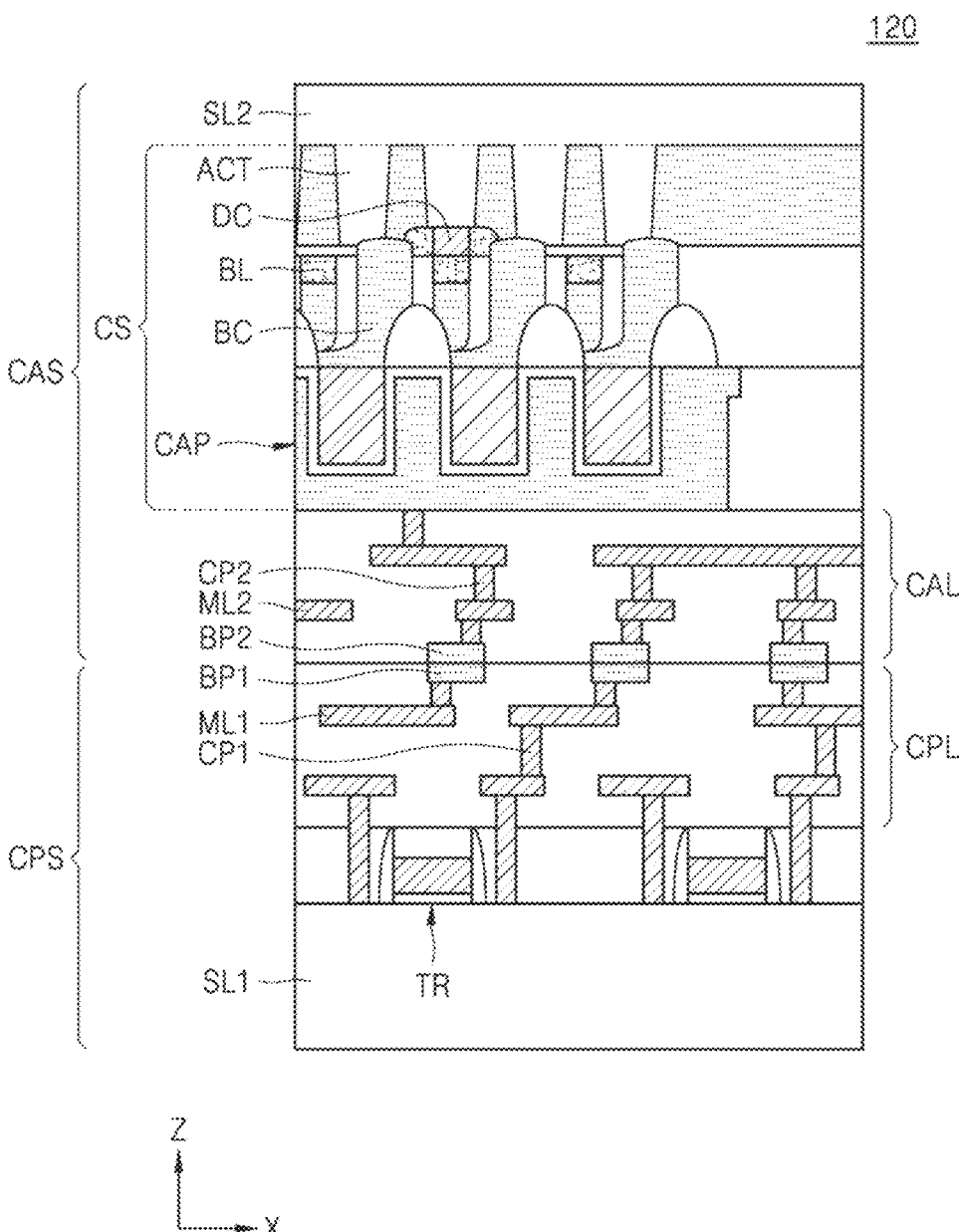
Figure 17A:
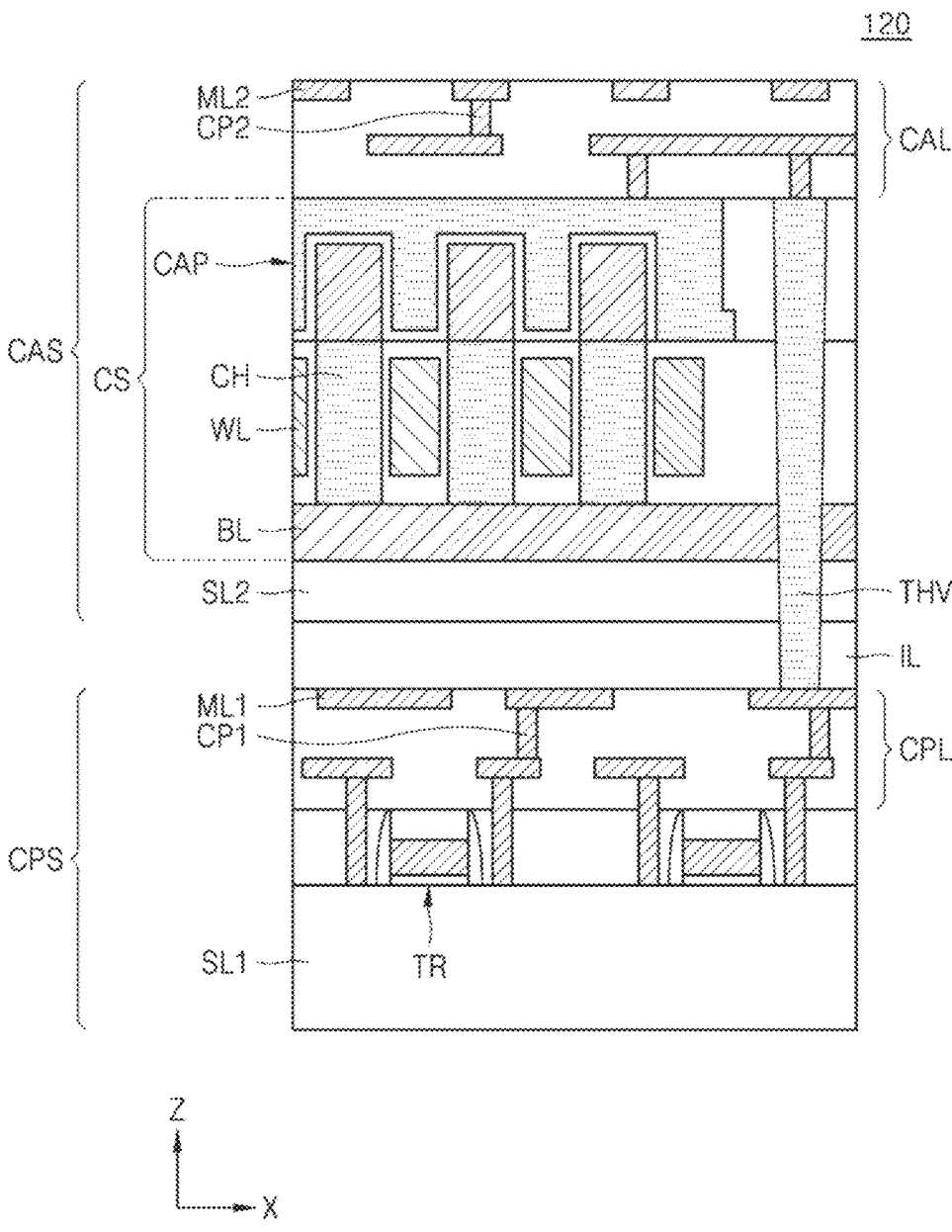
Figure 17B:
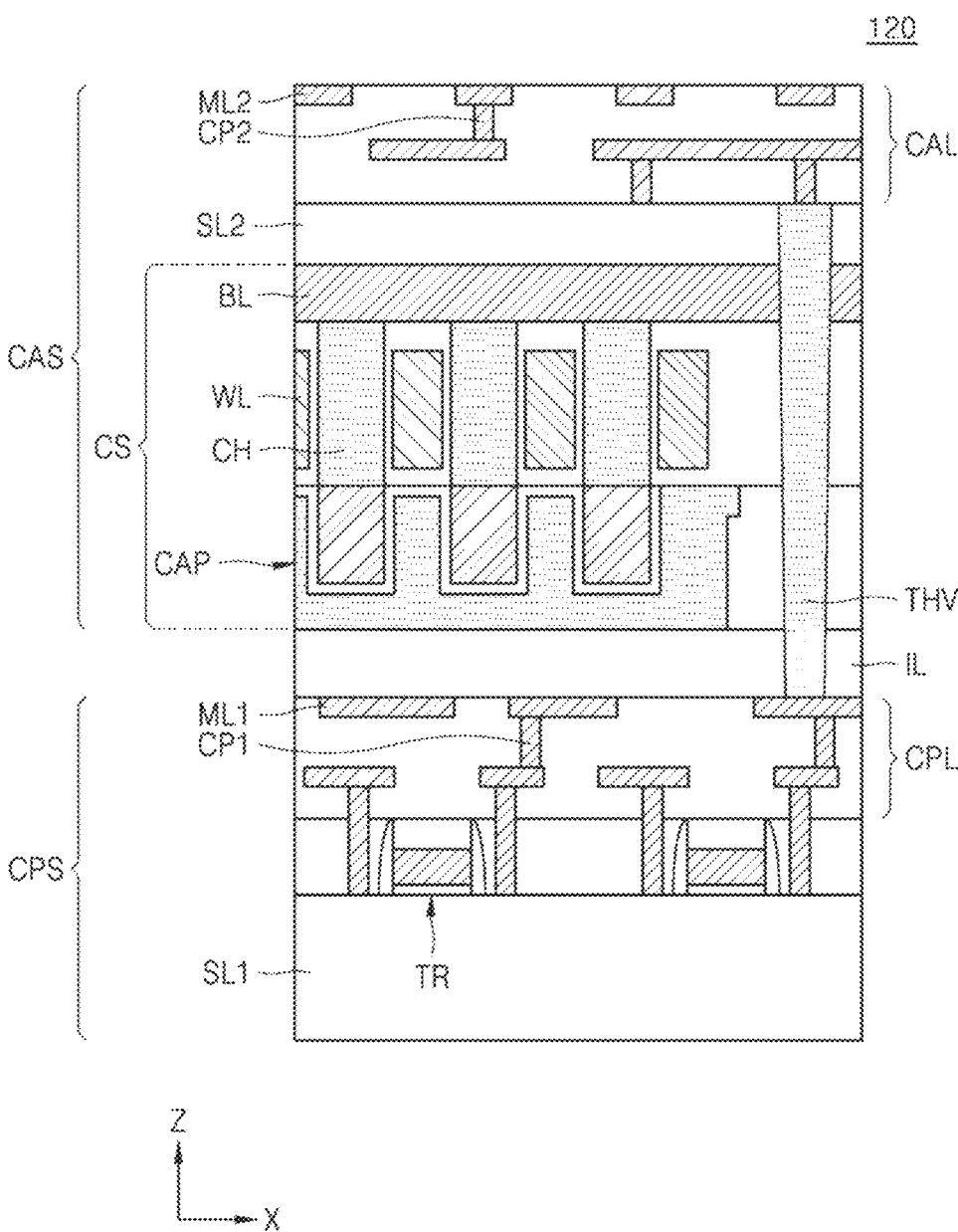
Figure 17C:
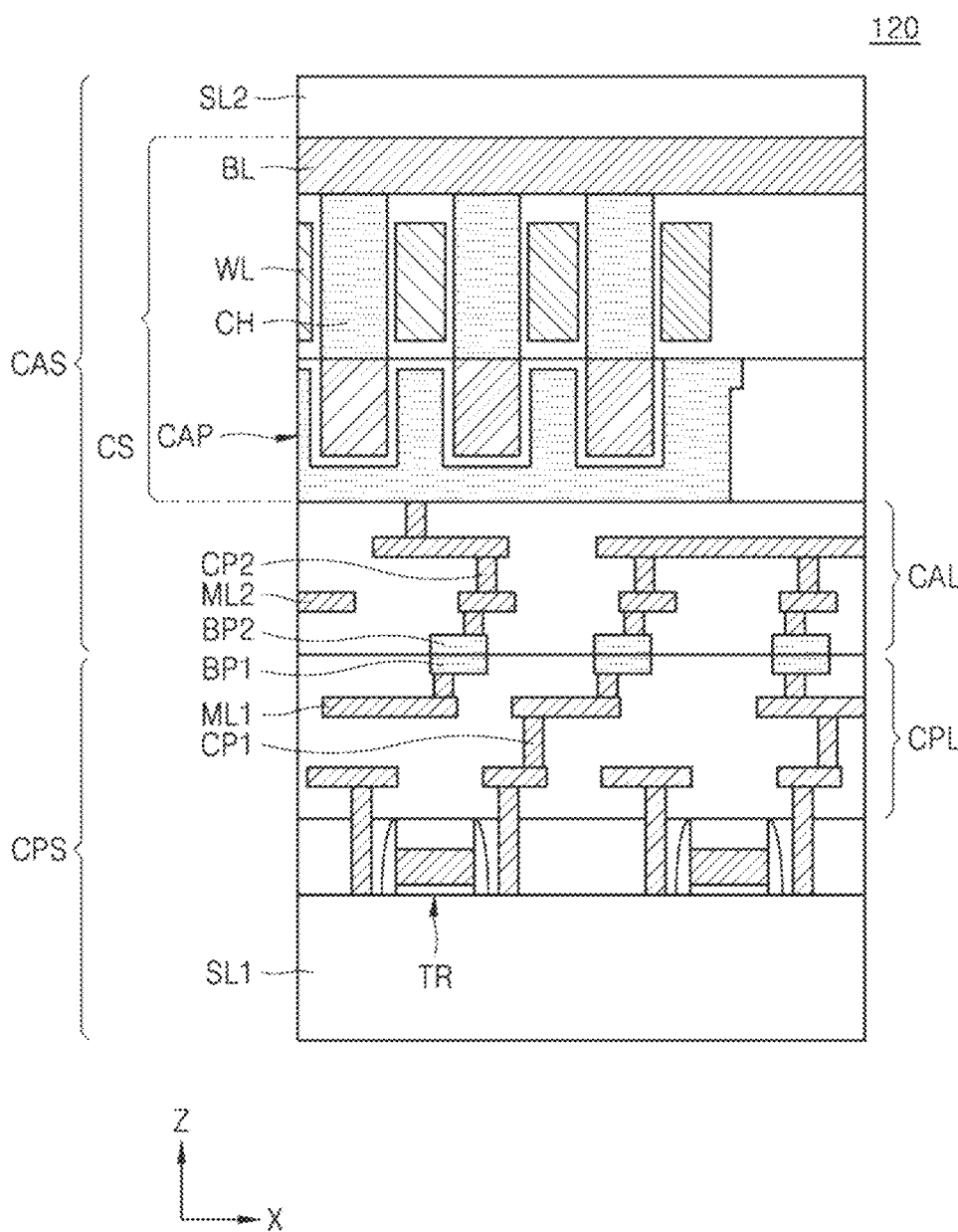

FIGS. 15 to 17C are diagrams illustrating a semiconductor structure of a memory device according to one or more embodiments. FIG. 15 shows a semiconductor structure of a Cell Over Peripheral (COP) structure. FIGS. 16A to 16C are cross-sectional views taken along line X1-X2 of FIG. 15, and a cell structure CS may include a buried channel array transistor (BCAT) structure. FIGS. 17A to 17C are cross-sectional views taken along line X1-X2 of FIG. 15, and the cell structure CS may include a vertical channel transistor (VCT) structure. Hereinafter, for convenience of explanation, descriptions that are the same as the descriptions of the cell array structure CAS and the core peripheral circuit structure CPS of FIG. 15 are omitted.

Referring to FIG. 15, the memory device 120 may include the cell array structure CAS and the core peripheral circuit structure CPS, which overlap each other in the vertical direction (Z direction), and may have a structure in which the cell array structure CAS is disposed above the core peripheral circuit structure CPS, that is, a COP structure. The cell array structure CAS may include the memory cell array 121 including the first to fourth bank arrays 2080*a* to 2080*d*. In the cell array structure CAS, the memory cell array 121 may include a plurality of memory cells including a BCAT structure or a VCT structure. In the cell array structure CAS, a plurality of bit lines BL may extend in a first horizontal direction (X direction) and a plurality of word lines WL may extend in a second horizontal direction (Y direction).

The core peripheral circuit structure CPS may include core circuits 1510 of the first to fourth banks BANK1 to BANK4 and a peripheral circuit 1520 of the memory device 120. The core circuits 1510 of each of the first to fourth banks BANK1 to BANK4 include bank core circuits 420 including the main word line driver circuit 601 (FIG. 6B) of the row decoder 2060 and the column decoder 2070, and each of the bank core circuits 420 may include the plurality of sub core circuits 430 respectively corresponding to the plurality of sub cell blocks 410 (FIG. 4) of each of the first to fourth bank arrays 2080*a* to 2080*d*. The peripheral circuit 1520 may include the address buffer 210, the control logic circuit 126, the input/output gating circuit 2090, and the data input/output buffer 2095 described with reference to FIG. 2.

Referring to FIGS. 15 and 16A, the core peripheral circuit structure CPS may include a semiconductor substrate SL1, and semiconductor devices, such as transistors TR, and a core peripheral wiring layer CPL including patterns CP1 and ML1 for wiring the semiconductor devices may be formed on the semiconductor substrate SL1, thereby forming the core circuit 1510 and the peripheral circuit 1520. The semiconductor substrate SL1 may include a semiconductor material, such as a silicon single crystal substrate, a silicon-germanium substrate, or an SOI substrate. The cell array structure CAS may include a semiconductor substrate SL2, the cell structure CS having DRAM cells formed therein and a cell wiring layer CAL including patterns CP2 and ML2 for wiring the DRAM cells may be formed on the semiconductor substrate SL2. The semiconductor substrate SL2 may be a semiconductor epitaxial layer including a semiconductor material. The cell structure CS may include DRAM cells having a BCAT structure including an active region ACT, a bit line node contact DC, the bit line BL, a storage node contact BC, and a capacitor structure CAP. An insulating layer IL may be arranged between the core peripheral circuit structure CPS and the cell array structure CAS, and a through conductive pattern THV may electrically connect the cell wiring layer CAL with the core peripheral wiring layer CPL. The through conductive pattern THV may penetrate the cell structure CS, the semiconductor substrate SL2, and the insulating layer IL in a third direction (Z direction), and may extend to the core peripheral circuit structure CPS to electrically connect the cell array structure CAS with the core peripheral circuit structure CPS.

Referring to FIG. 16B, compared to FIG. 16A, there are differences in that, in the cell array structure CAS, the cell wiring layer CAL is formed on an upper surface of the semiconductor substrate SL2, and the cell structure CS is formed on a lower surface of the semiconductor substrate SL2. Similar to the semiconductor substrate SL1 of the core peripheral circuit structure CPS, the semiconductor substrate SL2 may include a semiconductor material, such as a silicon single crystal substrate, a silicon-germanium substrate, or an SOI substrate. The through conductive pattern THV may penetrate the semiconductor substrate SL2, the cell structure CS, and the insulating layer IL to electrically connect the cell array structure CAS with the core peripheral circuit structure CPS.

Referring to FIG. 16C, compared to FIG. 16B, there are differences in that, in the cell array structure CAS, the cell wiring layer CAL is formed on an upper surface of the cell structure CS (in a direction opposite to the third direction (Z direction)), a bonding pad BP1 is formed on the top layer of the core peripheral wiring layer CPL, and a bonding pad BP2 is formed on the top layer of the cell wiring layer CAL. The bonding pads BP1 and BP2 may include copper with relatively low resistance. The bonding pad BP2 of the cell wiring layer CAL and the bonding pad BP1 of the core peripheral wiring layer CPL may be bonded together to electrically connect the cell array structure CAS with the core peripheral circuit structure CPS.

Referring to FIG. 17A, compared to FIG. 16A, the cell structure CS formed in the cell array structure CAS may include DRAM having a VCT structure including the bit line BL, a channel pattern CH, the word line WL, and the capacitor structure CAP. A VCT may refer to a structure in which the channel length of the channel pattern CH extends in the third direction (Z direction) perpendicular to an upper surface of the semiconductor substrate SL2. The channel pattern CH of the VCT may include a first source/drain region and a second source/drain region, which are arranged in the third direction (Z direction). For example, a lower portion of the channel pattern CH may function as the first source/drain region, and an upper portion of the channel pattern CH may function as the second source/drain region. A portion of the channel pattern CH between the first source/drain region and the second source/drain region may function as a channel region.

A contact film connected to an upper surface of the channel pattern CH may be formed on the channel pattern CH. The contact film may connect the channel pattern CH with the capacitor structure CAP. The capacitor structure CAP may be formed on an isolation insulating film and the contact film. The capacitor structure CAP may include a lower electrode, a capacitor dielectric film, and an upper electrode. The capacitor structure CAP may store charges in the capacitor dielectric film by using a potential difference generated between the lower electrode and the upper electrode. The through conductive pattern THV may penetrate the cell structure CS, the semiconductor substrate SL2, and the insulating layer IL to electrically connect the cell array structure CAS with the core peripheral circuit structure CPS.

Referring to FIG. 17B, compared to FIG. 17A, there are differences in that, in the cell structure CAS, the cell wiring layer CAL is formed on an upper surface of the semiconductor substrate SL2, and the cell structure CS is formed on a lower surface of the semiconductor substrate SL2. Similar to the semiconductor substrate SL1 of the core peripheral circuit structure CPS, the semiconductor substrate SL2 may include a semiconductor material, such as a silicon single crystal substrate, a silicon-germanium substrate, or an SOI substrate. The through conductive pattern THV may penetrate the semiconductor substrate SL2, the cell structure CS, and the insulating layer IL to electrically connect the cell array structure CAS with the core peripheral circuit structure CPS.

Referring to FIG. 17C, compared to FIG. 17B, there are differences in that, in the cell array structure CAS, the cell wiring layer CAL is formed on an upper surface of the cell structure CS (in a direction opposite to the third direction (Z direction)), the bonding pad BP1 is formed on the top layer of the core peripheral wiring layer CPL, and a bonding pad BP2 is formed on the top layer of the cell wiring layer CAL. The bonding pads BP1 and BP2 may include copper with relatively low resistance. The bonding pad BP2 of the cell wiring layer CAL and the bonding pad BP1 of the core peripheral wiring layer CPL may be bonded together to electrically connect the cell array structure CAS with the core peripheral circuit structure CPS.

Figure 18:
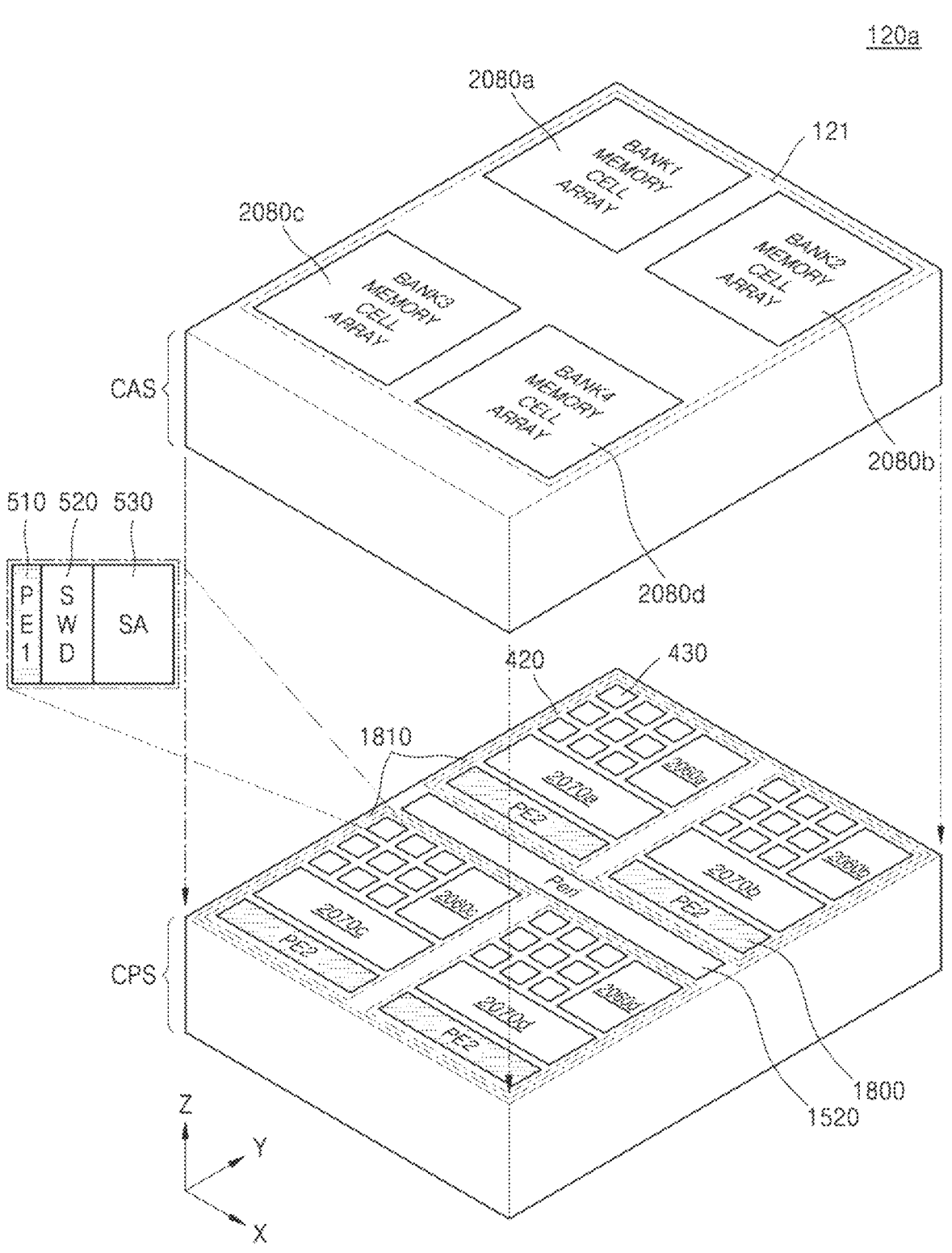
FIG. 18 is a diagram illustrating a semiconductor structure of a memory device according to one or more embodiments.
Figure 19:
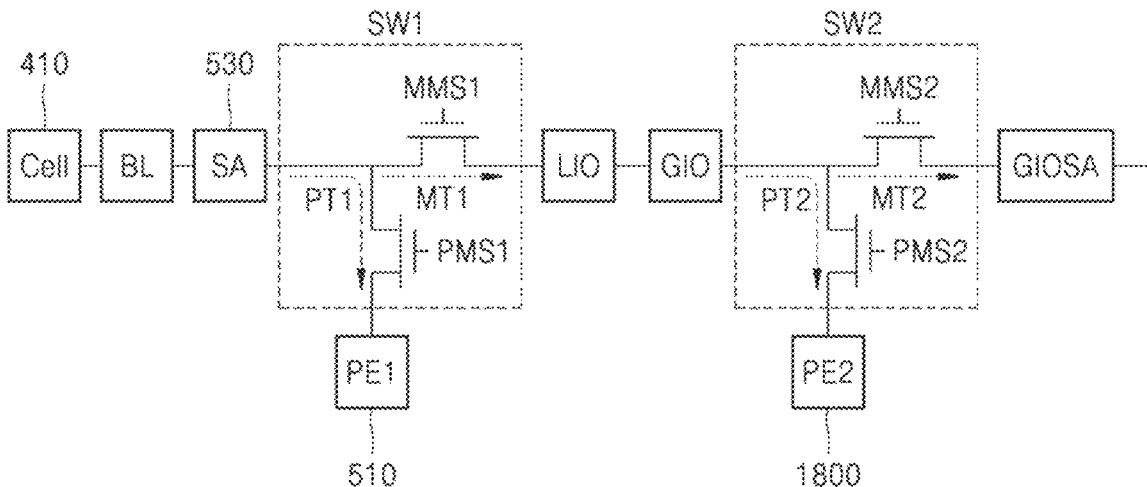
FIG. 19 illustrates a data path of the memory device of FIG. 18.

FIG. 18 is a diagram illustrating a semiconductor structure of a memory device, according to one or more embodiments. FIG. 19 shows a data path associated with first and second PEs 510 and 1800 of a memory device 120a of FIG. 18.

Referring to FIG. 18, compared to the memory device 120 of FIG. 15, there is a difference in that the memory device 120a further includes the second PE 1800 in a region of a core circuit 1810 of each of the first to fourth banks BANK1 to BANK4 of the core peripheral circuit structure CPS. The PE 510 in a region of the sub core circuit 430 may be referred to as a first PE so as to be distinguished from the second PE 1800.

The first PE 510 may perform a bit vector operation on data loaded into the sense amplifier 530 of the sub core circuit 430 corresponding to, for example, a certain sub cell block 410 of the first bank array 2080a, based on the first processing mode signal PMS1. The second PE 1800 may perform an operation to multiply matrices (for example, matrix A and matrix B). By using the second PE 1800, each row in the matrix A (for example, a certain sub cell block 410 of the first bank array 2080a) may be scanned (for example, by using a dot product operation) across all columns in the matrix B (for example, another sub cell block 410 of the first bank array 2080a) to calculate each row in an output matrix C. During the scanning (for example, dot product scanning), each number in an input row of the matrix A may be reused across all columns of the matrix B. Accordingly, according to one or more embodiments, each bit in a row of a matrix (for example, matrix A and/or matrix B) may be read only once, for example, by the second PE 1800.

Referring to FIG. 19, data read from the sub cell block 410 may be loaded into the sense amplifier 530 via the bit line BL. The data loaded into the sense amplifier 530 may be data of the bit line BL, which is sensed and amplified by the sense amplifier 530. The data loaded into the sense amplifier 530 may be transmitted to the first PE 510 or the local input/output line LIO via the first switch circuit SW1. In one or more embodiments, the sense amplifier 530 may include the first switch circuit SW1. The first switch circuit SW1 may include the first transistor PT1 connected between the sense amplifier 530 and the first PE 510 and the second transistor MT1 connected between the sense amplifier 530 and the local input/output line LIO. The first transistor PT1 may transmit the data loaded into the sense amplifier 530 to the first PE 510 in response to activation of the first processing mode signal PMS1. The first PE 510 may perform a bit vector operation on the data loaded into the sense amplifier 530 connected to one sub cell block 410 of the first bank array 2080a.

The second transistor MT1 may transmit the data loaded into the sense amplifier 530 to the local input/output line LIO in response to activation of the first memory mode signal MMS1. The data of the bit line BL, which is sensed by the sense amplifier 530, may be selectively transmitted to the local input/output line LIO by column-select transistors, and a local input/output line sense amplifier may amplify data of the local input/output line LIO. The data of the local input/output line LIO, which is amplified by the local input/output line sense amplifier, may be transmitted to the global input/output line GIO.

The data of the global input/output line GIO may be transmitted to the second PE 1800 or the global input/output line sense amplifier GIOSA via a second switch circuit SW2. The second switch circuit SW2 may include a third transistor PT2 connected between the global input/output line GIO and the second PE 1800 and a fourth transistor MT2 connected between the global input/output line GIO and the global input/output line sense amplifier GIOSA. The third transistor PT2 may transmit the data of the global input/output line GIO to the second PE 1800 in response to activation of the second processing mode signal PMS2. The second PE 1800 may perform, for example, an operation to multiply matrices (for example, matrix A and matrix B) in association with at least two sub cell blocks 410 of the first bank array 2080a.

The fourth transistor MT2 may transmit the data of the global input/output line GIO to the global input/output line sense amplifier GIOSA in response to activation of the second memory mode signal MMS2. The global input/output line sense amplifier GIOSA may amplify data of a global input/output line pair and output the data as read data to the memory controller 114 outside the memory device 120a via a data DQ pad(s).

Figure 20:
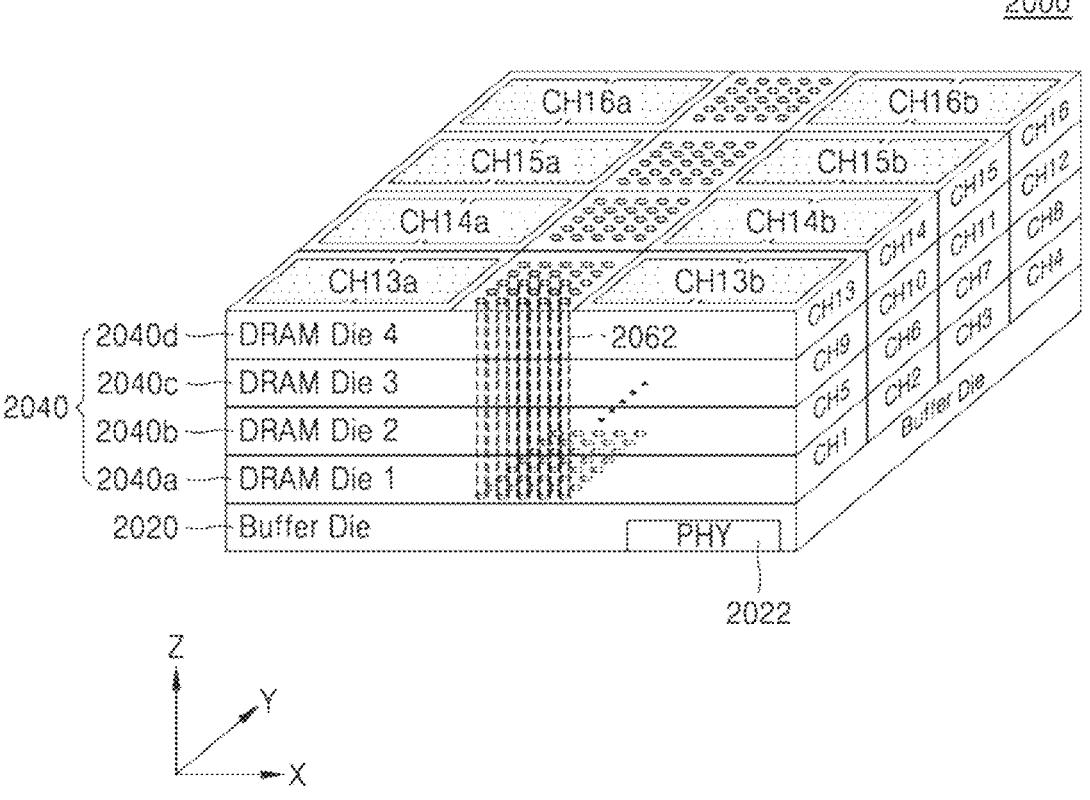
FIGS. 20 and 21 are diagrams illustrating a memory device according to one or more embodiments.
Figure 21:
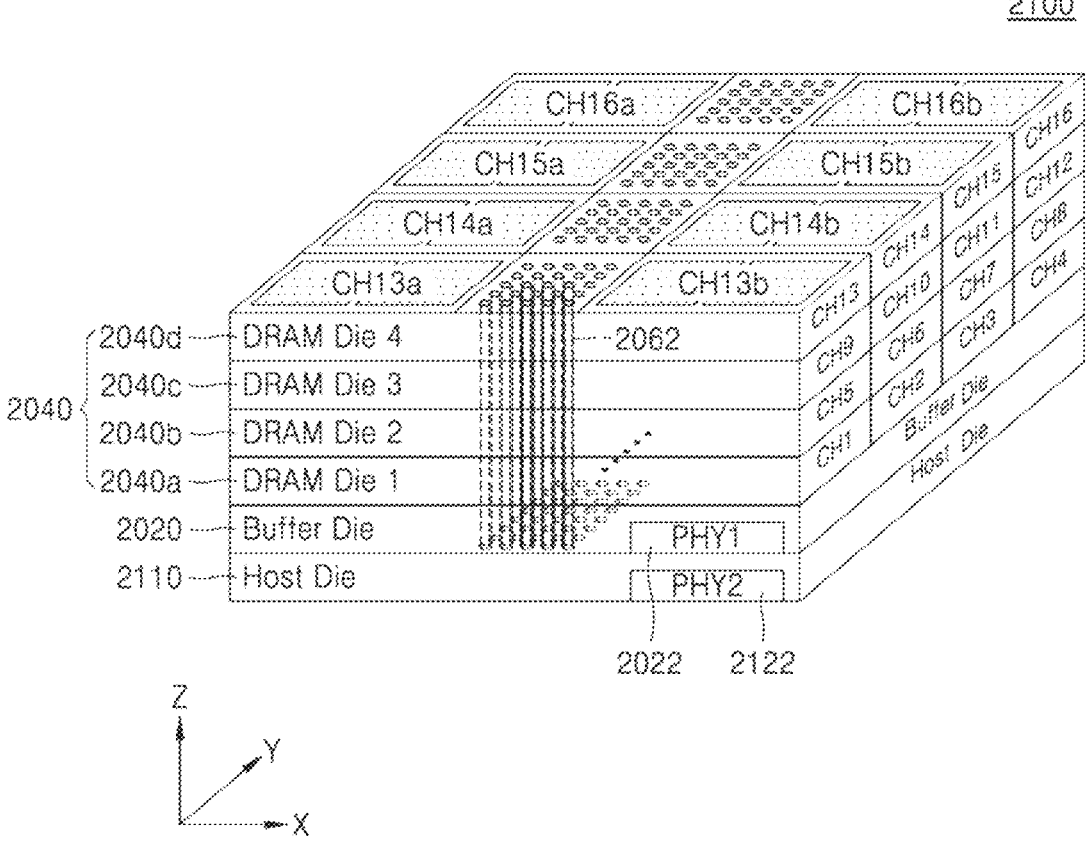

FIGS. 20 and 21 are diagrams illustrating a memory device according to one or more embodiments. Each of memory devices 2000 and 2100 of FIGS. 20 and 21 may be an HBM including a plurality of channels CHI to CH16 having independent access interfaces. Hereinafter, for convenience of explanation, the terms "memory devices 2000 and 2100" and "HBMs 2000 and 2100" may be used interchangeably.

Referring to FIG. 20, the HBM 2000 may include a plurality of dies, and may include a buffer die 2020 and a DRAM die stack 2040 stacked on the buffer die 2020. The DRAM die stack 2040 may include four DRAM dies 2040a to 2040d, and the DRAM dies 2040a to 2040d may support 16 channels CH1 to CH16. For example, the first DRAM die 2040a may include the first to fourth channels CH1 to CH4, the second DRAM die 2040b may include the fifth to eighth channels CH5 to CH8, the third DRAM die 2040c may include the ninth to twelve channels CH9 to CH12, and the fourth DRAM die 2040d may include the thirteenth to sixteenth channels CH13 to CH16. In the present embodiment, it is illustrated that the HBM 2000 includes four DRAM dies 2040a to 2040d and one DRAM die includes four channels, but the disclosure is not limited thereto, and various numbers of DRAM dies each supporting two channels may be stacked to contribute to memory capacity.

Each of the channels CH1 to CH16 of the DRAM dies 2040a to 2040d may be implemented as the memory devices 120 and 120a described with reference to FIGS. 1 to 19. Each of the memory devices 120 and 120a may be implemented with a cell array structure including a plurality of banks each segmented into sub cell blocks, and a core peripheral circuit structure vertically overlapping the cell array structure and including, in a bank core circuit connected to a bank, sub core circuits respectively connected to the sub cell blocks. In the core peripheral circuit structure, each of the sub core circuits may include: a segmented sense amplifier connected to each of the sub cell blocks; and a first PE that performs a logical operation on an operand that is data loaded into the segmented sense amplifier, and the bank core circuit may include a second PE that performs a logical operation on an operand that is data of a corresponding bank among the plurality of banks. The memory device may be configured such that PEs that use, as bits of an operand, data loaded from a plurality of cell blocks in a bank into a segmented sense amplifier perform logical operations. As a result, the number of memory reads (or loads) and memory writes (or stores) may be reduced, and accordingly, processing efficiency and speed of the memory devices 120 and 120a may be improved and/or power consumption thereof may be reduced and latency associated with the memory devices 120 and 120a may be reduced.

The buffer die 2020 may communicate with the memory controller 114 (FIG. 1) via conductive elements, such as bumps or solder balls, formed on an outer surface of the HBM 2000. The buffer die 2020 may receive the command/address CMD/ADDR and the data DQ from the memory controller 114, and may provide the received command/address CMD/ADDR and the received data DQ to an access channel of the DRAM die stack 2040. In addition, the buffer die 2020 may provide, to the memory controller 114, the data DQ output from the access channel of the DRAM die stack 2040.

The HBM 2000 may include a plurality of through silicon vias (TSVs) 2062 penetrating the DRAM dies 2040a to 2040d of the DRAM die stack 2040. When each of the channels CH1 to CH16 has a bandwidth of 64 bits of the data DQ, the TSVs 2062 may include components for inputting/outputting 1020-bit data. Each of the channels CH1 to CH16 may be arranged separately on the left and right, and for example, in the fourth DRAM die 2040d, the thirteenth channel CH13 may be separated into pseudo channels CH13a and CH13b, the fourteenth channel CH14 may be separated into pseudo channels CH14a and CH14b, the fifteenth channel CH15 may be separated into pseudo channels CH15a and CH15b, and the sixteenth channel CH16 may be separated into pseudo channels CH16a and CH16b. Each of the pseudo channels CH13a to CH16a and CH13b to CH16b may include 32-bit data DQ. The TSVs 2062 may be arranged between the pseudo channels CH13a to CH16a and CH13b to CH16b of the thirteenth to sixteenth channels CH13 to CH16.

The buffer die 2020 may include an interface circuit 2022 for performing data communication with the memory controller 114. The interface circuit 2022 may include a physical or electrical layer and a logical layer, which are provided for signals, frequency, timing, driving, detailed operating parameters and functionality required for efficient communication between the memory controller 114 and the HBM 2000. The interface circuit 2022 may perform memory interfacing, such as selecting a row and column corresponding to a memory cell, writing data to a memory cell, or reading written data, on the channels CH1 to CH16 of the DRAM dies 2040a to 2040d. The buffer die 2020 may receive the first and second processing mode signals PMS1 and PMS2 described with reference to FIG. 18, select one of the first and second PEs 510 and 1800, based on each of the first and second processing mode signals PMS1 and PMS2, and control an internal processing operation to be performed by using the selected PE.

Referring to FIG. 21, compared to the HBM 2000 of FIG. 20, there is a difference in that the HBM 2100 further includes a host die 2110 below the buffer die 2020. The host die 2110 may be configured identically to the host device 110 described with reference to FIG. 1. The host die 2110 may include a CPU, GPU, NPU, DSP and/or application processor (AP) that perform computer operations. The buffer die 2020 may include, for example, a first interface circuit 2022 for performing data communication with the CPU of the host die 2110, and the host die 2110 may include a second interface circuit 2122 connected with the first interface circuit 2022. The second interface circuit 2122 may perform memory interfacing, such as transmitting a memory cell address and write data to the first interface circuit 2022 and receiving read data output from the first interface circuit 2022. The first interface circuit 2022 may perform memory interfacing, such as selecting a row and column corresponding to a memory cell, writing data to a memory cell, or reading written data, on the channels CH1 to CH16 of the DRAM dies 2040a to 2040d. The HBM 2100 may include the plurality of TSVs 2062 penetrating the DRAM dies 2040a to 2040d of the DRAM die stack 2040 and the buffer die 2020. The TSVs 2062 may be arranged between pseudo channels CH1a to CH16a and CH11b to CH16b of the DRAM dies 2040a to 2040d, and arranged in a central portion of the buffer die 2020.

Figure 22:
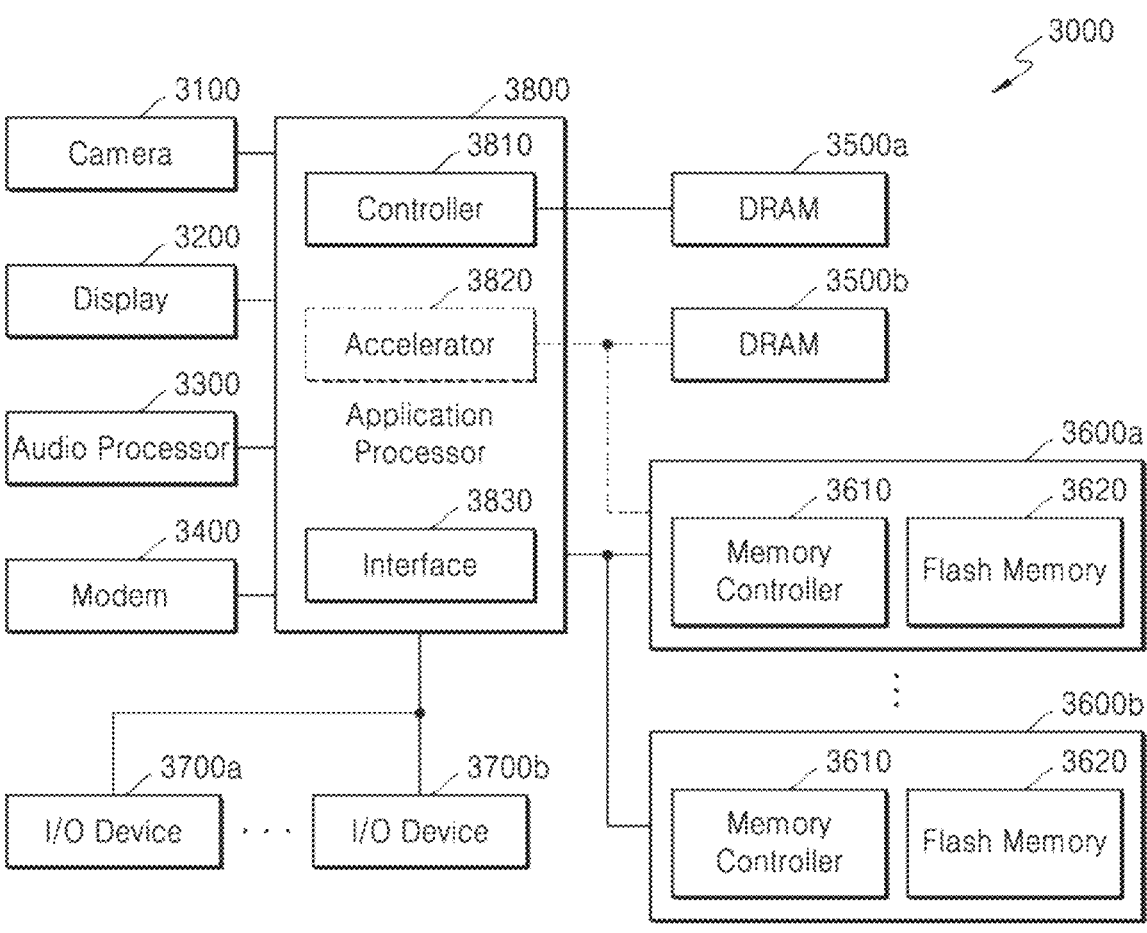
FIG. 22 is a block diagram of a system for illustrating an electronic device including a memory device, according to one or more embodiments.

FIG. 22 is a block diagram of a system 3000 for illustrating an electronic device including a memory device, according to one or more embodiments.

Referring to FIG. 22, the system 3000 may include a camera 3100, a display 3200, an audio processor 3300, a modem 3400, DRAMs 3500a and 3500b, flash memories 3600a and 3600b, I/O devices 3700a and 3700b, and an AP 3800. The system 3000 may be implemented as a laptop computer, a mobile phone, a smartphone, a tablet personal computer (PC), a wearable device, a healthcare device, or an Internet of Things (IoT) device. In addition, the system 3000 may be implemented as a server or a PC.

The camera 3100 may capture a still image or a moving image under control by a user, and may store captured image/video data or transmit the captured image/video data to the display 3200. The audio processor 3300 may process audio data included in the flash memories 3600a and 3600b or network content. The modem 3400 may modulate and transmit a signal for wired/wireless data transmission/reception, and a modulated signal may be demodulated by a receiver to restore an original signal. The I/O devices 3700a and 3700b may include devices that provide a digital input and/or output function, such as a universal serial bus (USB), a storage, a digital camera, a Secure Digital (SD) card, a digital versatile disc (DVD), a network adapter, a touch screen, etc.

The AP 3800 may control all operations of the system 3000. The AP 3800 may include a control block 3810, an accelerator block or accelerator chip 3820, and an interface block 3830. The AP 3800 may control the display 3200, such that a part of content stored in the flash memories 3600a and 3600b is displayed on the display 3200. When a user input is received via the I/O devices 3700a and 3700b, the AP 3800 may perform a control operation corresponding to the user input. The AP 3800 may include an accelerator block which is a circuit dedicated for AI data operation, or may include the accelerator chip 3820 separately from the AP 3800. The DRAM 3500b may be additionally provided in the accelerator block or accelerator chip 3820. The accelerator is a functional block that specializes in performing a particular function of the AP 3800, and the accelerator may include a GPU which is a functional block that specializes in processing graphic data, an NPU which is a block that specializes in performing AI calculation and interference, and a data processing unit (DPU) which is a block that specializes in data transmission.

The system 3000 may include a plurality of DRAMs 3500a and 3500b. The AP 3800 may set up a DRAM interface protocol and communicate with the DRAMs 3500a and 3500b to control the DRAMs 3500a and 3500b via commands complying with the joint electron device engineering council (JEDEC) standard and mode register (MRS) setting or to use company-specific functions like low voltage/high-speed/reliability and a cyclic redundancy check (CRC)/error correction code (ECC) function. For example, the AP 3800 may communicate with the DRAM 3500a via an interface complying with the JEDEC standard like LPDDR4, LPDDR5, etc., and the accelerator block or accelerator chip 3820 may set up and a new DRAM interface protocol and communicate with the DRAM 3500b to control the DRAM 3500b for an accelerator, which has a bandwidth greater than that of the DRAM 3500a.

Although FIG. 22 illustrates only the DRAMs 3500a and 3500b, the disclosure is not limited thereto. As long as bandwidth, response speed and voltage conditions of the AP 3800 or accelerator chip 3820 are satisfied, any memory, such as PRAM, SRAM, MRAM, RRAM, FRAM, or hybrid RAM, may be used. The DRAMs 3500a and 3500b has relatively less latency and bandwidth than those of the I/O devices 3700a and 3700b or the flash memories 3600a and 3600b. The DRAMs 3500a and 3500b are initialized when the system 3000 is powered on and an operating system and application data are loaded, and thus the DRAMs 3500a and 3500b may be used as temporary storages for the operating system and the application data or may be used as execution spaces for various software codes.

Four fundamental arithmetic operations, that is, addition/subtraction/multiplication/division, a vector operation, an address operation, or a fast Fourier transform (FFT) operation may be performed in the DRAMs 3500a and 3500b. In addition, functions for executions used for inference may be performed in the DRAMs 3500a and 3500b. In this regard, the inference may be performed in a deep learning algorithm using an artificial neural network. The deep learning algorithm may include a training operation, in which a model is trained by using various pieces of data, and an inference operation, in which data is recognized by using the trained model. In an embodiment, an image captured by a user via the camera 3100 is signal-processed and stored in the DRAM 3500b, and the accelerator block or accelerator chip 3820 may perform AI data operation to recognize data by using data stored in the DRAM 3500b and a function used for inference.

The system 3000 may include a plurality of storages or flash memories 3600a and 3600b, which have a larger capacity than the DRAMs 3500a and 3500b. The accelerator block or accelerator chip 3820 may perform a training operation and an AI data operation by using the flash memories 3600a and 3600b. In an embodiment, the flash memories 3600a and 3600b may include a memory controller 3610 and a flash memory device 3620, and may more efficiently perform a training operation and an inference AI data operation, which are performed by the AP 3800 and/or the accelerator chip 3820, by using a computing device provided in the memory controller 3610. The flash memories 3600a and 3600b may store images captured via the camera 3100 or may store data received via a data network. For example, the flash memories 3600a and 3600b may store augmented reality/virtual reality content, high definition (HD) content, or ultra high definition (UHD) content.

In the system 3000, the DRAMs 3500*a* and 3500*b* may include the memory device described with reference to FIGS. 1 to 21. Modifications, additions, or omissions may be made to the memory device without departing from the scope of the disclosure. For example, a memory device may be implemented with a cell array structure including a plurality of banks each segmented into sub cell blocks, and a core peripheral circuit structure vertically overlapping the cell array structure and including, in a bank core circuit connected to a bank, sub core circuits respectively connected to the sub cell blocks. In the core peripheral circuit structure, each of the sub core circuits may include: a segmented sense amplifier connected to each of the sub cell blocks; and a first PE that performs a logical operation on an operand that is data loaded into the segmented sense amplifier, and the bank core circuit may include a second PE that performs a logical operation on an operand that is data of a corresponding bank among the plurality of banks. The memory device may be configured such that PEs that use, as bits of an operand, data loaded from a plurality of cell blocks in a bank into a segmented sense amplifier perform logical operations. As a result, the number of memory reads (or loads) and memory writes (or stores) may be reduced, and accordingly, processing efficiency and speed of the memory device may be improved and/or power consumption thereof may be reduced and latency associated with the memory device may be reduced.

While the disclosure has been particularly shown and described with reference to embodiments thereof, it will be understood that various changes in form and details may be made therein without departing from the spirit and scope of the following claims.

What is claimed is:

1. A memory device comprising:
a plurality of banks, wherein each bank of the plurality of banks individually comprises:
a plurality of sub cell blocks, wherein each of the plurality of sub cell blocks individually comprises a plurality of memory cells;
a plurality of word lines;
a plurality of bit lines; and
a bank core circuit comprising:
a row decoder connected to the plurality of memory cells via the plurality of word lines extending in a first horizontal direction, wherein the row decoder comprises a plurality of sub word line driver segments;
a sense amplifier connected to the plurality of memory cells via the plurality of bit lines extending in a second horizontal direction crossing the first horizontal direction, wherein the sense amplifier comprises a plurality of sense amplifier segments; and
a plurality of sub core circuits comprising a first processing element, a sub word line driver segment of the plurality of sub word line driver segments, and a sense amplifier segment of the plurality of sense amplifier segments, wherein the first processing element and the sense amplifier segment of each sub core circuit of the plurality of sub core circuits are connected,
wherein the plurality of sub core circuits of a given bank of the plurality of banks are correspondingly connected to the plurality of sub cell blocks of the given bank of the plurality of banks, wherein for each individual bank of the plurality of banks, the plurality of sub cell blocks form a cell array structure, and the bank core circuit forms a core peripheral circuit structure,
wherein for each individual bank of the plurality of banks, the cell array structure of the individual bank is disposed on the core peripheral circuit structure of the individual bank and overlaps the core peripheral circuit structure of the individual bank in a vertical direction, and
wherein each sub core circuit of the plurality of sub core circuits of each individual bank of the plurality of banks is configured to perform a logical operation on an operand comprising data loaded into the plurality of sense amplifier segments of the bank core circuit of the individual bank.

2. The memory device of claim 1,
wherein the row decoder of each individual bank of the plurality of banks further comprises a main word line driver circuit,
wherein the row decoder of each individual bank of the plurality of banks is configured to receive row address signals comprising upper bit group signals and lower bit group signals and to select one or more word lines among each of the plurality of word lines of each individual bank of the plurality of banks,
wherein the main word line driver circuit of each individual bank of the plurality of banks is configured to generate main word line driving signals based on the upper bit group signals and to generate sub word line driving signals based on the lower bit group signals,
wherein the plurality of sub word line driver segments of each individual bank of the plurality of banks is configured to select one word line among the plurality of word lines of the individual bank of the plurality of banks based on the main word line driving signals and the sub word line driving signals,
wherein the plurality of sub word line driver segments of each individual bank of the plurality of banks is segmented in the first horizontal direction, and
wherein each sub core circuit of the plurality of sub core circuits of each individual bank of the plurality of banks comprises a corresponding sub word line driver segment.

3. The memory device of claim 1, wherein for each sub core circuit of the plurality of sub core circuits of each individual bank of the plurality of banks, the first processing element is adjacent to and arranged between the sub word line driver segment in a first sub core circuit region and a sense amplifier segment of another sub core circuit of the plurality of sub core circuits of the individual bank of the plurality of banks in a neighboring sub core circuit region, in the first horizontal direction.

4. The memory device of claim 1, wherein for each sub core circuit of the plurality of sub core circuits of each individual bank of the plurality of banks, the first processing element is arranged between the sub word line driver segment and the sense amplifier segment in a corresponding sub core circuit region, and the sub word line driver segment, the first processing element, and the sense amplifier segment are arranged adjacent to each other in the first horizontal direction.

5. The memory device of claim 1, wherein for each sub core circuit of the plurality of sub core circuits of each individual bank of the plurality of banks, the sense amplifier segment is segmented and arranged into two groups in a corresponding sub core circuit region, and the first processing element is arranged between the corresponding two groups of the sense amplifier segment in the corresponding sub core circuit region.

6. The memory device of claim 5, wherein each sub core circuit of the plurality of sub core circuits of each individual bank of the plurality of banks further comprises a second processing element separated from the first processing element.

7. The memory device of claim 6, wherein for each sub core circuit of the plurality of sub core circuits of each individual bank of the plurality of banks, the second processing element-is arranged between the sub word line driver segment and the first processing element in the corresponding sub core circuit region.

8. The memory device of claim 6, wherein for each sub core circuit of the plurality of sub core circuits of each individual bank of the plurality of banks, the second processing element is arranged between the sub word line driver segment in the corresponding sub core circuit region and the first processing element of another sub core circuit of the plurality of sub core circuits of the individual bank of the plurality of banks in a neighboring sub core circuit region.

9. The memory device of claim 1, wherein each sub core circuit of the plurality of sub core circuits of each individual bank of the plurality of banks further comprises a second processing element configured to perform a logical operation on an operand comprising data of the individual bank among the plurality of banks.

10. The memory device of claim 9, wherein the memory device is configured to perform a logical operation by using one of the first processing element and the second processing element of each sub core circuit of the plurality of sub core circuits of each individual bank of the plurality of banks.

11. A memory device comprising:
a plurality of banks, wherein each bank of the plurality of banks individually comprises:
a plurality of sub cell blocks, wherein each of the plurality of sub cell blocks individually comprises a plurality of memory cells;
a plurality of word lines;
a plurality of bit lines; and
a bank core circuit comprising:
a row decoder connected to the plurality of memory cells via the plurality of word lines extending in a first horizontal direction; and
a sense amplifier connected to the plurality of memory cells via the plurality of bit lines extending in a second horizontal direction crossing the first horizontal direction, wherein the sense amplifier comprises a plurality of sense amplifier segments correspondingly connected to the plurality of sub cell blocks;
a plurality of sub core circuits correspondingly connected to the plurality of sub cell blocks; and
a first processing element connected to the plurality of sense amplifier segments and arranged in the first horizontal direction and configured to perform a logical operation on an operand comprising data loaded into the plurality of sense amplifier segments,
wherein for each individual bank of the plurality of banks, the plurality of sub cell blocks form a cell array structure, and the bank core circuit forms a core peripheral circuit structure, and
wherein for each individual bank of the plurality of banks, the cell array structure of the individual bank is disposed on the core peripheral circuit structure of the individual bank and overlaps the core peripheral circuit structure of the individual bank in a vertical direction.

12. The memory device of claim 11, wherein for each individual bank of the plurality of banks, the bank core circuit further comprises a second processing element configured to perform a logical operation on an operand comprising data of the individual bank among the plurality of banks.

13. The memory device of claim 12, wherein the memory device is configured to perform a logical operation by using one of the first processing element and the second processing element.

14. A memory device comprising:
a buffer die comprising an interface circuit configured to control data input and data output of the memory device; and
a memory die stack on the buffer die and comprising a stack of a plurality of memory dies,
wherein each of the plurality of memory dies individually comprises:
a plurality of banks, wherein each bank of the plurality of banks individually comprises:
a plurality of sub cell blocks, wherein each of the plurality of sub cell blocks individually comprises a plurality of memory cells;
a plurality of word lines;
a plurality of bit lines; and
a bank core circuit comprising:
a row decoder connected to the plurality of memory cells via the plurality of word lines extending in a first horizontal direction, wherein the row decoder comprises a plurality of sub word line driver segments;
a sense amplifier connected to the plurality of memory cells via the plurality of bit lines extending in a second horizontal direction crossing the first horizontal direction, wherein the sense amplifier comprises a plurality of sense amplifier segments; and
a plurality of sub core circuits comprising a first processing element, a sub word line driver segment of the plurality of sub word line driver segments, and a sense amplifier segment of the plurality of sense amplifier segments, wherein the first processing element and the sense amplifier segment of each sub core circuit of the plurality of sub core circuits are connected,
wherein the plurality of sub core circuits of a given bank of the plurality of banks are correspondingly connected to the plurality of sub cell blocks of the given bank of the plurality of banks,
wherein for each individual bank of the plurality of banks, the plurality of sub cell blocks form a cell array structure, and the bank core circuit forms a core peripheral circuit structure,
wherein for each individual bank of the plurality of banks, the cell array structure of the individual bank is disposed on the core peripheral circuit structure of the individual bank and overlaps the core peripheral circuit structure of the individual bank in a vertical direction, and
wherein each sub core circuit of the plurality of sub core circuits of each individual bank of the plurality of banks is configured to perform a logical operation on an operand comprising data loaded into the plurality of sense amplifier segments of the bank core circuit of the individual bank.

15. The memory device of claim 14, wherein each sub core circuit of the plurality of sub core circuits of each individual bank of the plurality of banks further comprises a second processing element configured to perform a logical operation on an operand comprising data of the individual bank among the plurality of banks.

16. The memory device of claim 15, wherein the memory device performs a logical operation by using one of the first processing element and the second processing element of each sub core circuit of the plurality of sub core circuits of each individual bank of the plurality of banks.

17. The memory device of claim 14, further comprising a host die bonded with the buffer die.

18. The memory device of claim 14, wherein for each sub core circuit of the plurality of sub core circuits of each individual bank of the plurality of banks, the first processing element is adjacent to and arranged between the sub word line driver segment in a first sub core circuit region and a sense amplifier segment of another sub core circuit of the plurality of sub core circuits of the individual bank of the plurality of banks in a neighboring sub core circuit region, in the first horizontal direction.

19. The memory device of claim 14, wherein for each sub core circuit of the plurality of sub core circuits of each individual bank of the plurality of banks, the first processing element is arranged between the sub word line driver segment and the sense amplifier segment in a corresponding sub core circuit region, and the sub word line driver segment, the first processing element, and the sense amplifier segment are arranged adjacent to each other in the first horizontal direction.

20. The memory device of claim 14, wherein for each sub core circuit of the plurality of sub core circuits of each individual bank of the plurality of banks, the sense amplifier segment is segmented and arranged into two groups in a corresponding sub core circuit region, and the first processing element is arranged between the corresponding two groups of the sense amplifier segment in the corresponding sub core circuit region.

*     *     *     *     *